United States Patent
Hammura

(10) Patent No.: US 10,394,401 B2
(45) Date of Patent: Aug. 27, 2019

(54) WIRING BODY, WIRING BOARD, AND TOUCH SENSOR

(71) Applicant: FUJIKURA LTD., Tokyo (JP)

(72) Inventor: Tetsu Hammura, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/739,109

(22) PCT Filed: Jun. 22, 2016

(86) PCT No.: PCT/JP2016/068554
§ 371 (c)(1),
(2) Date: Dec. 21, 2017

(87) PCT Pub. No.: WO2016/208636
PCT Pub. Date: Dec. 29, 2016

(65) Prior Publication Data
US 2018/0181234 A1  Jun. 28, 2018

(30) Foreign Application Priority Data

Jun. 22, 2015  (JP) .................................. 2015-124738
Jul. 31, 2015  (JP) .................................. 2015-152536

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04103* (2013.01); *G06F 2203/04112* (2013.01)

(58) Field of Classification Search
CPC ............... G06F 3/044; G06F 3/0416; G06F 2203/04103; G06F 2203/0411; G06F 3/041–044; G06F 2203/04112
See application file for complete search history.

(56) References Cited

U.S. PATENT DOCUMENTS

2008/0135283 A1  6/2008  Hibino et al.
2010/0230154 A1  9/2010  Naito et al.
(Continued)

FOREIGN PATENT DOCUMENTS

JP   H02-206193 A    8/1990
JP   2006-302930 A   11/2006
(Continued)

OTHER PUBLICATIONS

Office Action issued in corresponding Japanese Patent Application No. 2015-152536 dated Mar. 29, 2016, with translation (6 pages).
(Continued)

*Primary Examiner* — Temesghen Ghebretinsae
*Assistant Examiner* — Ivelisse Martinez Quiles
(74) *Attorney, Agent, or Firm* — Osha Liang LLP

(57) ABSTRACT

A wiring body includes: a first resin layer; an electrode layer on the first resin layer and formed by first conductor lines; a first lead wire layer on the first resin layer and formed by second conductor lines; and a boundary line interposed between the electrode layer and the first lead wire layer. The wiring body satisfies $W_1<W_2$ and $L_1>W_3$ where $W_1$ represents a width of the first conductor lines in a direction orthogonal to an extending direction of the first conductor lines, $W_2$ represents a width of the second conductor lines in a direction orthogonal to an extending direction of the second conductor lines, $L_1$ represents a length of the boundary line in its extending direction, and $W_3$ represents a width of the one end part of the first lead wire layer in a direction orthogonal to an extending direction of the first lead wire layer.

12 Claims, 21 Drawing Sheets

(56) References Cited

U.S. PATENT DOCUMENTS

| | | | |
|---|---|---|---|
| 2013/0271675 A1 | 10/2013 | Misaki | |
| 2014/0152917 A1* | 6/2014 | Lee | G06F 3/044 349/12 |
| 2014/0231120 A1 | 8/2014 | Nakamura | |
| 2014/0238730 A1 | 8/2014 | Nakamura | |
| 2014/0290984 A1 | 10/2014 | Zhou et al. | |
| 2014/0290995 A1 | 10/2014 | Gao et al. | |
| 2014/0293150 A1* | 10/2014 | Tang | G06F 3/044 349/12 |
| 2014/0307178 A1 | 10/2014 | Tang et al. | |
| 2014/0327842 A1 | 11/2014 | Tang et al. | |
| 2015/0109246 A1 | 4/2015 | Lee et al. | |
| 2015/0199049 A1* | 7/2015 | Yang | G06F 3/044 345/174 |
| 2015/0205424 A1* | 7/2015 | Park | G06F 3/044 345/174 |
| 2016/0011683 A1 | 1/2016 | Koshimizu et al. | |
| 2016/0132153 A1* | 5/2016 | Lin | G06F 3/044 345/174 |
| 2016/0139709 A1* | 5/2016 | Chung | G06F 3/044 345/174 |
| 2016/0202833 A1* | 7/2016 | Kim | G06F 3/0416 345/173 |
| 2016/0274727 A1* | 9/2016 | Nakamura | G06F 3/044 |
| 2017/0010720 A1 | 1/2017 | Nakayama | |
| 2017/0097700 A1* | 4/2017 | Kim | G06F 3/044 |
| 2017/0308192 A1* | 10/2017 | Ogura | G06F 3/041 |

FOREIGN PATENT DOCUMENTS

| | | |
|---|---|---|
| JP | 2008-113098 A | 5/2008 |
| JP | 2011-096225 A | 5/2011 |
| JP | 2012-108844 A | 6/2012 |
| JP | 2012-168301 A | 9/2012 |
| JP | 2013-127658 A | 6/2013 |
| JP | 2013-152599 A | 8/2013 |
| JP | 2014-016857 A | 1/2014 |
| JP | 5456177 B2 | 3/2014 |
| JP | 2014-135074 A | 7/2014 |
| JP | 3191884 U | 7/2014 |
| JP | 2014-191717 A | 10/2014 |
| JP | 2014-207283 A | 10/2014 |
| JP | 2015-079513 A | 4/2015 |
| JP | 2015-515709 A | 5/2015 |
| KR | 101527320 B1 | 6/2015 |
| TW | M472937 U | 2/2014 |
| WO | 2014/153897 A1 | 10/2014 |
| WO | 2014/153898 A1 | 10/2014 |
| WO | 2014/157632 A1 | 10/2014 |
| WO | 2014/166175 A1 | 10/2014 |
| WO | 2015/174126 A1 | 11/2015 |

OTHER PUBLICATIONS

Decision of Refusal issued in corresponding Japanese Patent Application No. 2015-152536 dated Oct. 18, 2016, with translation (5 pages).

Office Action issued in corresponding Japanese Patent Application No. 2017-524950 dated Nov. 21, 2017, with translation (8 pages).

Extended European Search Report issued in corresponding European Application No. 16814406.1 dated Oct. 9, 2018 (12 pages).

* cited by examiner

WIRING BODY, WIRING BOARD, AND TOUCH SENSOR

TECHNICAL FIELD

The present invention relates to a wiring body, a wiring board, and a touch sensor.

The contents of Patent Application No. 2015-124738, filed with Japan Patent Office on Jun. 22, 2015, and Patent Application No. 2015-152536, filed with Japan Patent Office on Jul. 31, 2015, are incorporated herein by reference in the designated countries in which the incorporation by reference is accepted.

BACKGROUND ART

A conductive sheet is known in which an electrode terminal is electrically connected to an end part of an electrode pattern constituted of fine metal lines and the electrode terminal includes a mesh shape comprising lattices constituted of fine metal lines (see Patent Document 1, for example).

PATENT DOCUMENT

[Patent Document 1] JP2013-127658A

In Document 1, the conductive sheet cannot be reduced in size because the electrode pattern and an external circuit are connected via the electrode terminal.

SUMMARY OF INVENTION

One or more embodiments of the present invention provide a wiring body, a wiring board, and a touch sensor that are able to be reduced in size.

<1> The wiring body according to one or more embodiments of the present invention comprises a first resin layer, an electrode layer provided on the first resin layer and formed by first conductor lines, the electrode layer having a mesh-like shape, a first lead wire layer provided on the first resin layer and formed by second conductor lines, the first lead wire layer having a mesh-like shape, and a boundary line interposed between the electrode layer and the first lead wire layer and in contact with at least two of the first conductor lines and one end part of the first lead wire layer, the boundary line having a line-like shape. The wiring body satisfies following Expressions (1) and (2);

$$W_1 < W_2 \quad (1)$$

$$L_1 > W_3 \quad (2)$$

In the above Expressions (1) and (2), $W_1$ represents a width of the first conductor lines in a direction orthogonal to an extending direction of the first conductor lines, $W_2$ represents a width of the second conductor lines in a direction orthogonal to an extending direction of the second conductor lines, $L_1$ represents a length of the boundary line in its extending direction, and $W_3$ represents a width of the one end part of the first lead wire layer in a direction orthogonal to an extending direction of the first lead wire layer.

<2> In one or more embodiments of the invention, the first lead wire layer may have substantially the same width between the one end part and a portion at which the first lead wire layer curves first.

<3> In one or more embodiments of the invention, the electrode layer may be configured such that unit meshes having the same shape is arranged, and the wiring body may satisfy a following Expression (3);

$$D > W_3 \quad (3)$$

In the above Expression (3), D represents a maximum value of a width of the unit meshes in a direction orthogonal to an extending direction of the electrode layer.

<4> In one or more embodiments of the invention, a first region may be defined by the second conductor lines and the boundary line and the first region may be filled with a material having conductivity.

<5> In one or more embodiments of the invention, first adhesion surfaces between the first conductor lines and the first resin layer may curve convexly toward the first conductor lines in a cross-sectional view, second adhesion surfaces between the second conductor lines and the first resin layer may curve convexly toward the second conductor lines in a cross-sectional view, and the wiring body may satisfy a following Expression (4);

$$R_1 < R_2 \quad (4)$$

In the above Expression (4), $R_1$ represents a curvature of the first adhesion surfaces and $R_2$ represents a curvature of the second adhesion surfaces.

<6> In one or more embodiments of the invention, conductor lines including the first conductor lines, the second conductor lines, and the boundary line may each have a first surface contacted with the first resin layer and a second surface opposite to the first surface, and surface roughness of the first surface may be relatively larger than surface roughness of the second surface.

<7> In one or more embodiments of the invention, the boundary line may extend nonlinearly.

<8> In one or more embodiments of the invention, the wiring body may further comprise at least one second lead wire layer having one end connected to the boundary line and the other end connected to the first lead wire layer, the second lead wire layer being formed by third conductor lines and having a mesh-like shape, the first lead wire layer and the second lead wire layer may be separated from each other, and a region in which the second conductor lines and the third conductor lines are not formed may be provided between the first lead wire layer and the second lead wire layer which are adjacent to each other.

<9> In one or more embodiments of the invention, the second conductor lines which constitute the first lead wire layer may be arranged to incline with respect to the extending direction of the first lead wire layer, the third conductor lines which constitute the second lead wire layer may be arranged to incline with respect to an extending direction of the second lead wire layer, a side end part of the first lead wire layer may extend in the extending direction of the first lead wire layer in a zigzag shape by the second conductor lines which constitute the first lead wire layer, and a side end part of the second lead wire layer may extend in the extending direction of the second lead wire layer in a zigzag shape by the third conductor lines which constitute the second lead wire layer.

<10> In one or more embodiments of the invention, the wiring body may satisfy a following Expression (5);

$$W_1 < W_4 \quad (5)$$

In the above Expression (5), $W_4$ represents a width of the boundary line.

<11> In one or more embodiments of the invention, the electrode layer may be configured such that unit meshes having the same shape is arranged, and the wiring body may satisfy a Expression (6);

$$D \leq L_2 \quad (6)$$

In the above Expression (6), D represents a maximum value of a width of the unit meshes in a direction orthogonal to an extending direction of the electrode layer and $L_2$ represents a distance in the extending direction of the boundary line between the first lead wire layer and the second lead wire layer which are adjacent to each other.

<12> The wiring board according to one or more embodiments of the present invention comprises the above wiring body and a support body supporting the wiring body.

<13> The touch sensor according to one or more embodiments of the present invention comprises the above wiring board.

According to one or more embodiments of the present invention, the electrode layer and the lead wire layer are connected via the boundary line having a line-like shape. When the electrode layer and the lead wire layers are connected, therefore, no electrode terminal is necessary and the wiring body can thus be reduced in size.

DETAILED DESCRIPTION

Hereinafter, embodiments of the present invention will be described with reference to the drawings. The drawings used in the following description may illustrate some essential portions in an enlarged fashion for the purpose of easy understanding of the features of the present invention, and the dimensional ratio and the like of each constitutional element may not necessarily be the same as actual ones.

First Embodiment

Figure 1:
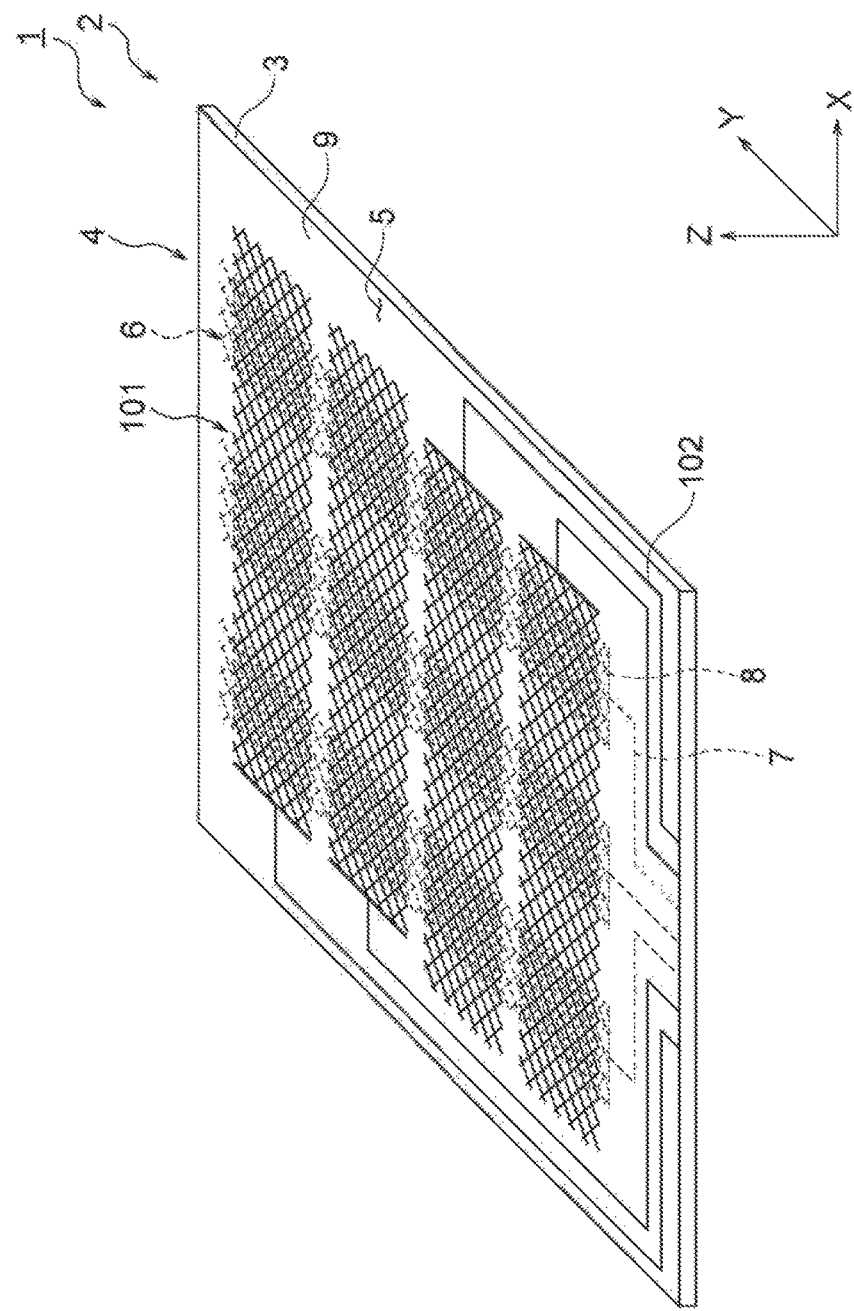
FIG. 1 is a perspective view illustrating a touch sensor according to a first embodiment of the present invention.
Figure 2:
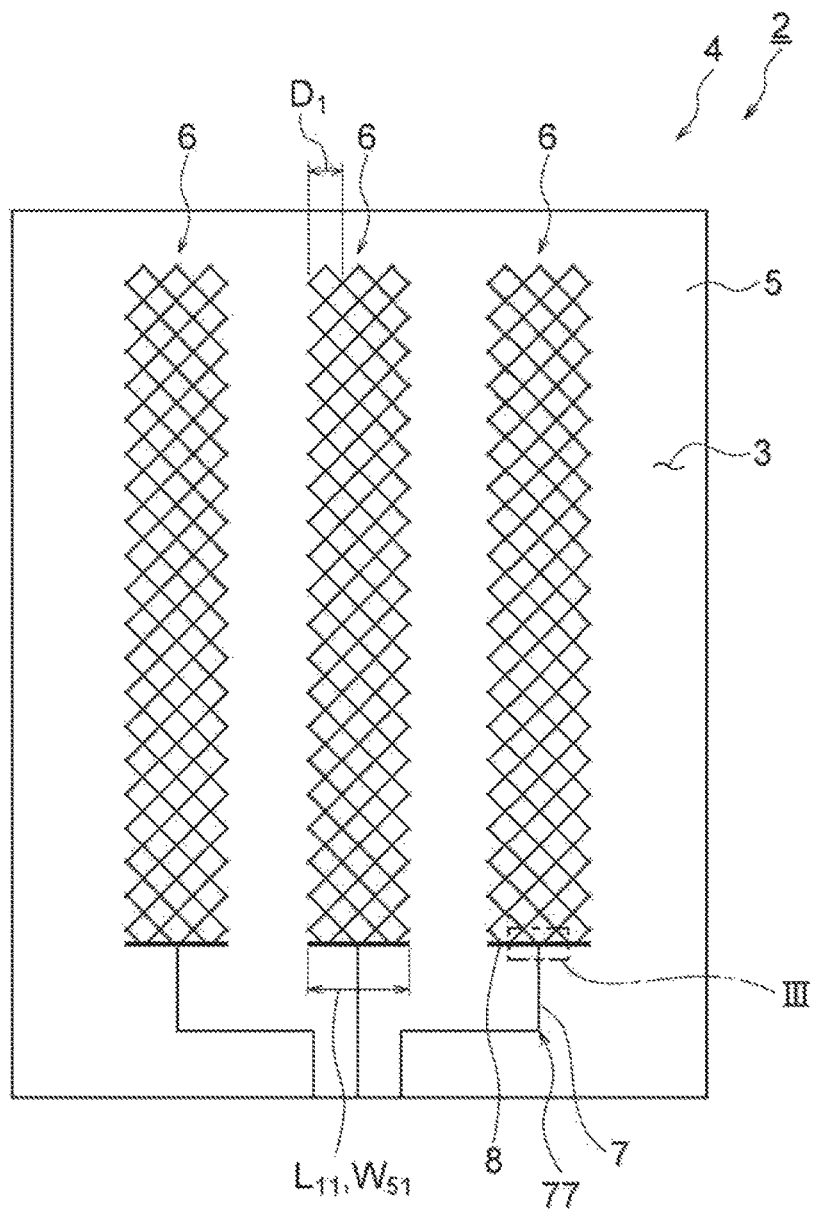
FIG. 2 is a plan view illustrating a wiring board according to the first embodiment of the present invention.
Figure 3:
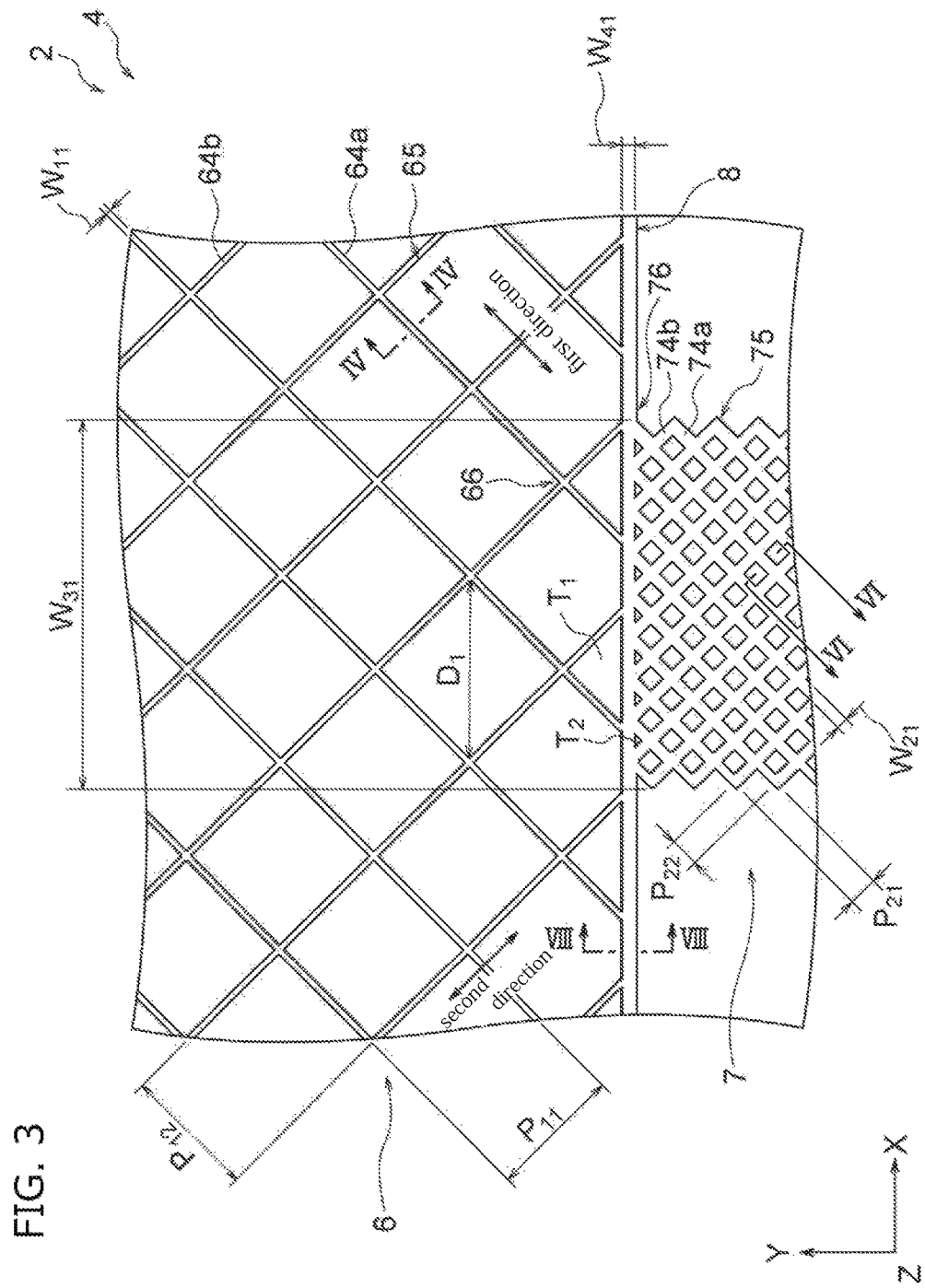
FIG. 3 is a partially-enlarged view of part III of FIG. 2.
Figure 4:
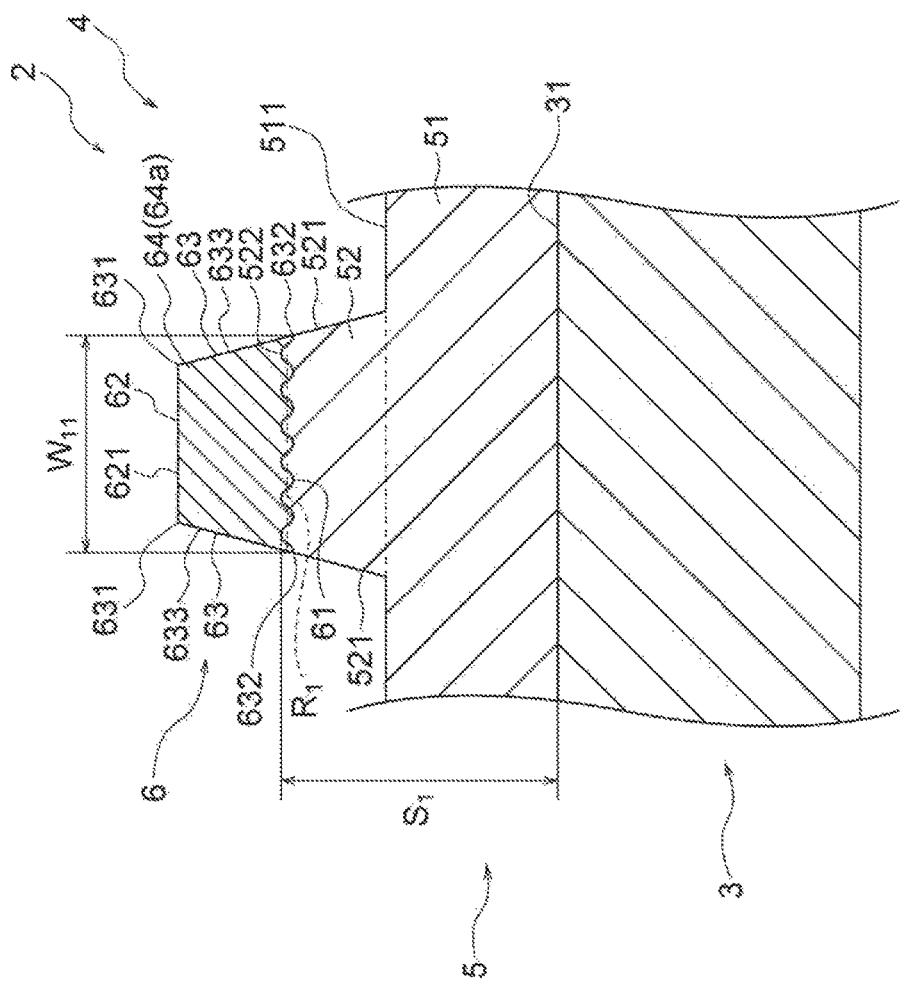
FIG. 4 is a cross-sectional view along line IV-IV of FIG. 3.
Figure 5:
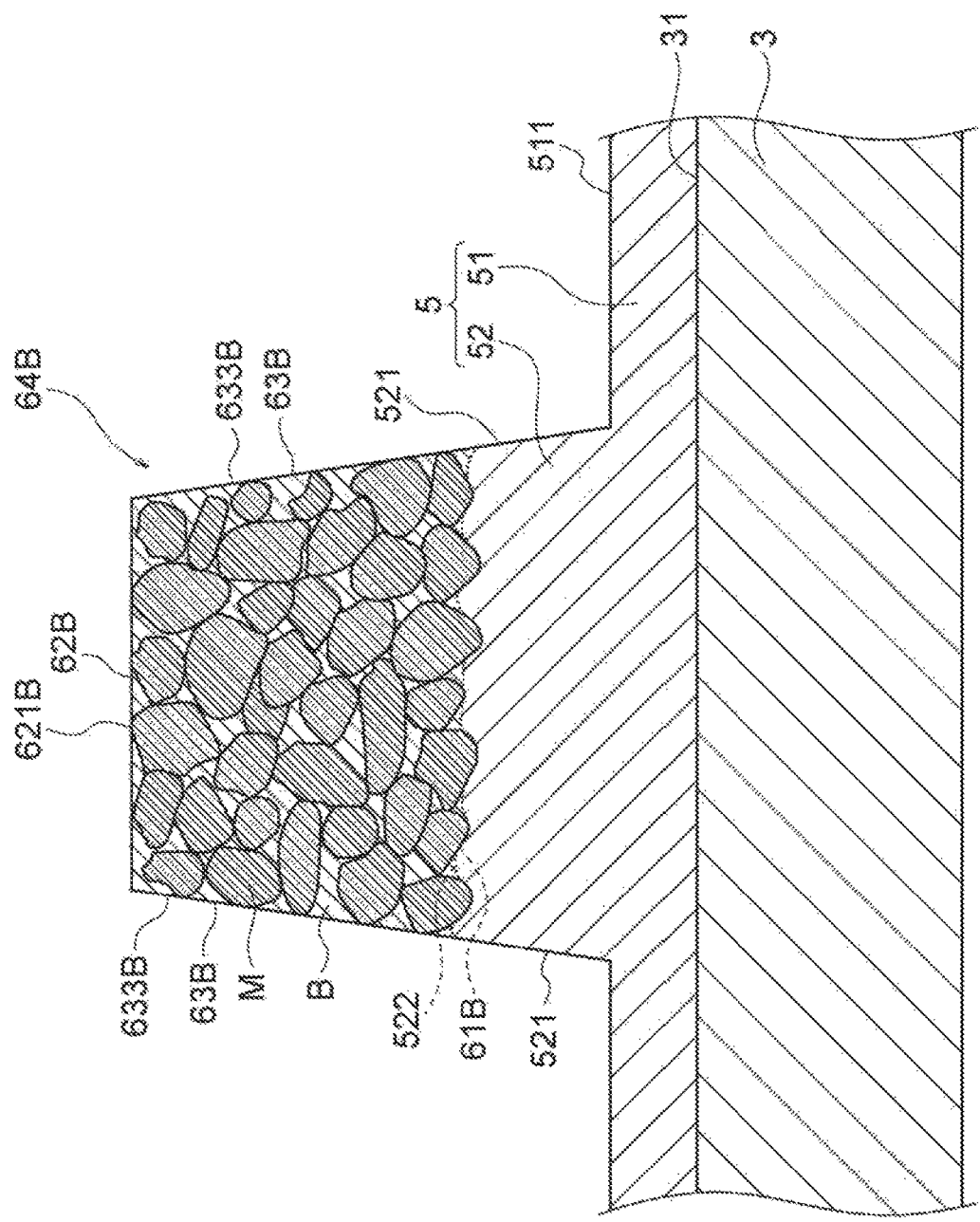
FIG. 5 is a cross-sectional view for describing a first conductor line according to the first embodiment of the present invention.
Figure 6:
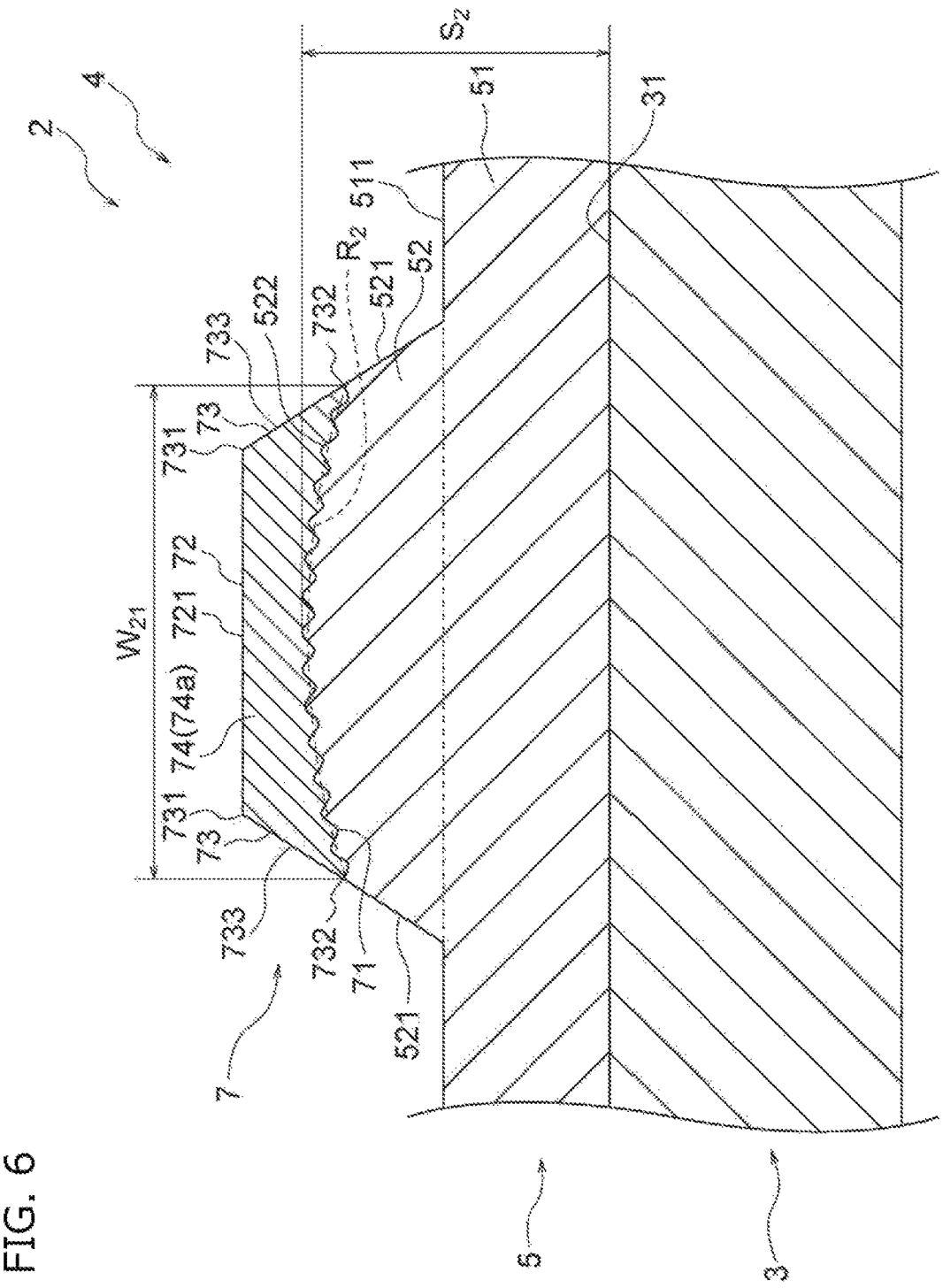
FIG. 6 is a cross-sectional view along line VI-VI of FIG. 3.
Figure 7:
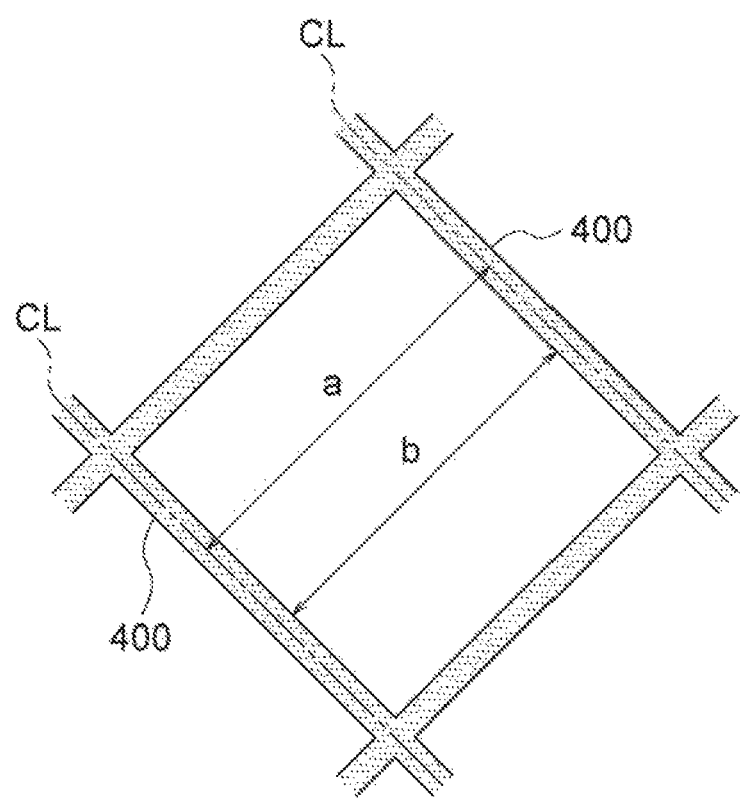
FIG. 7 is an explanatory view for describing an aperture ratio.
Figure 8:
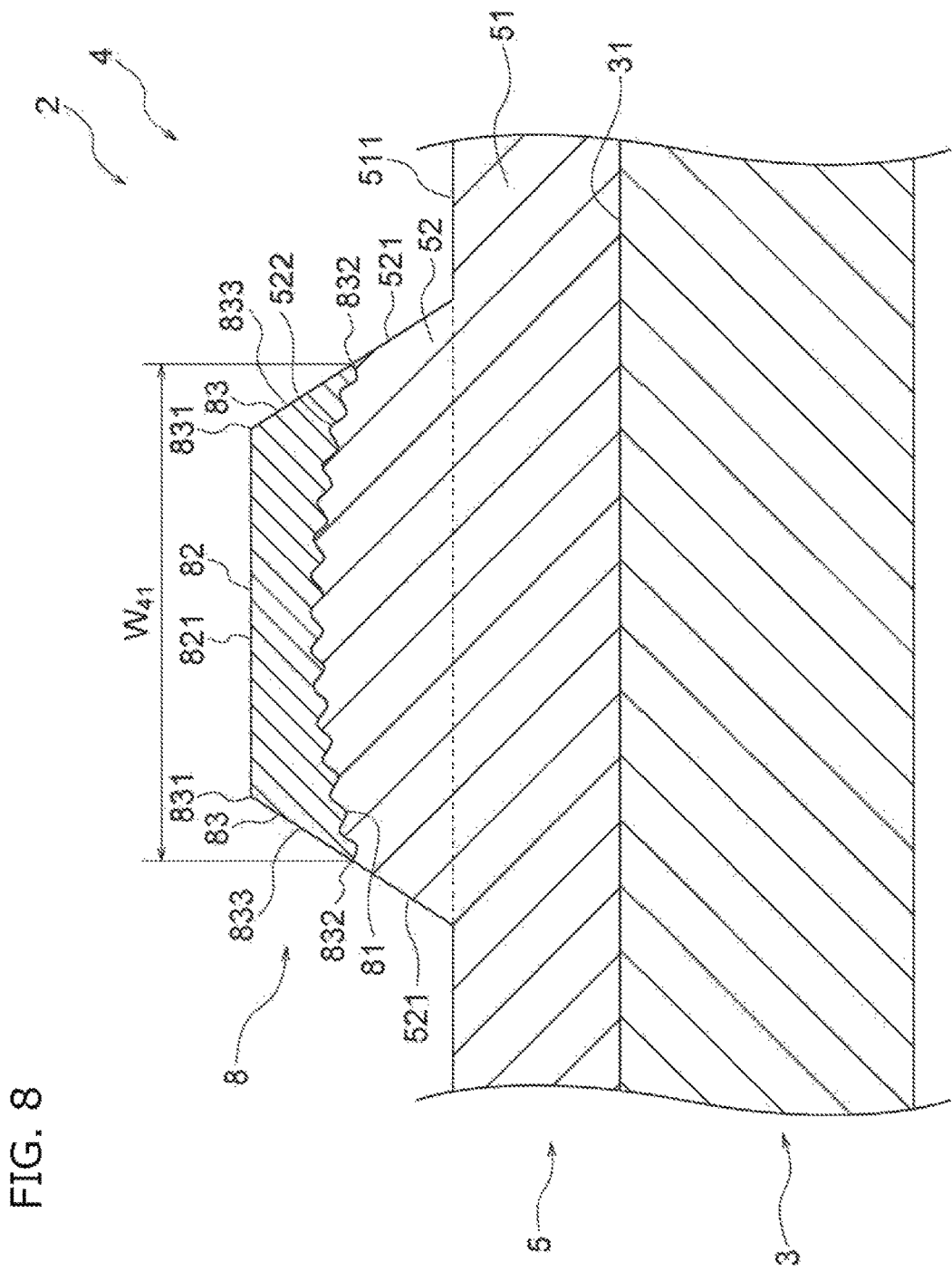
FIG. 8 is a cross-sectional view along line VIII-VIII of FIG. 3.
Figure 9:
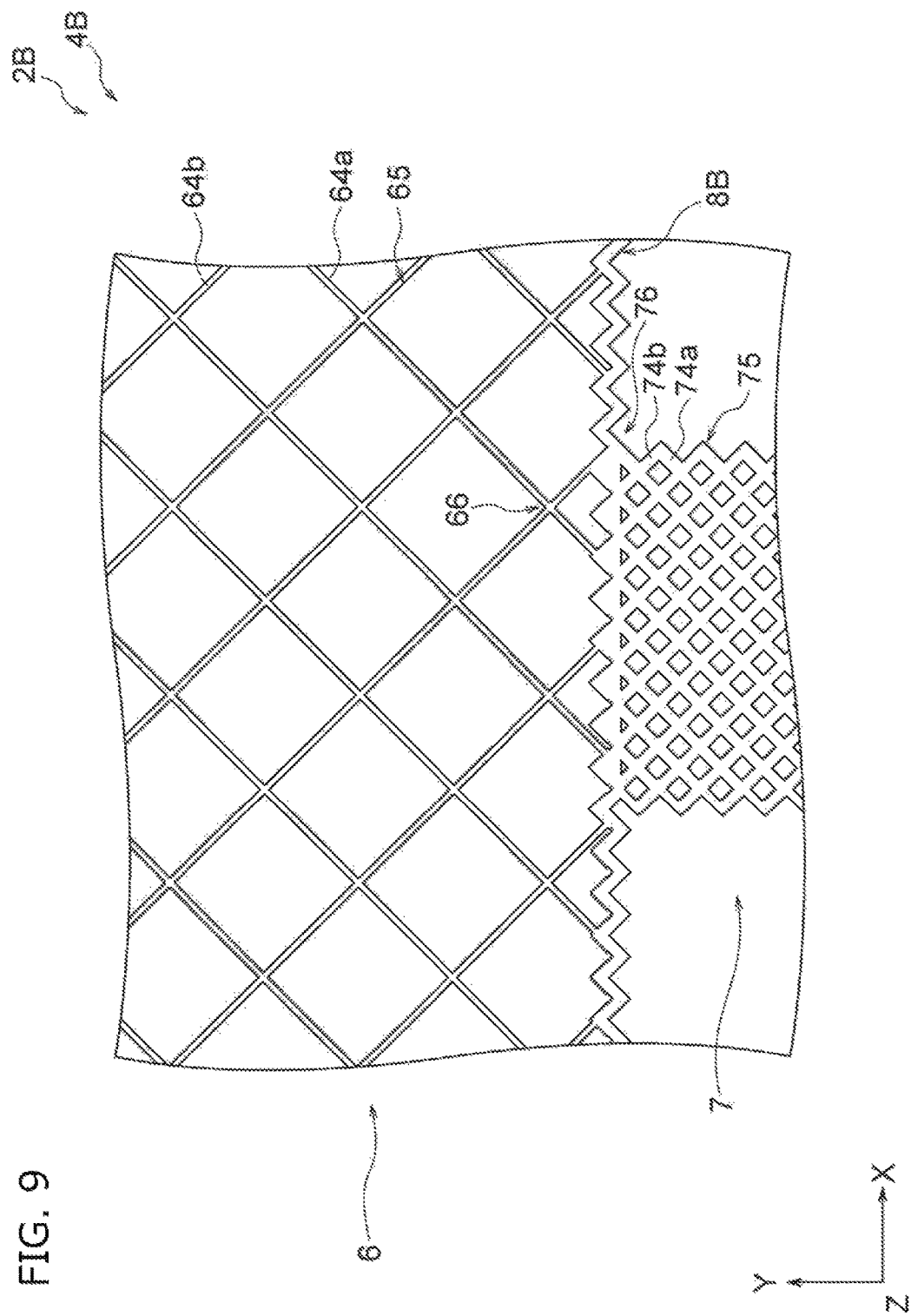
FIG. 9 is a plan view illustrating a first modified example of the wiring board according to the first embodiment of the present invention.

FIG. 1 is a perspective view illustrating a touch sensor according to a first embodiment of the present invention, FIG. 2 is a plan view illustrating a wiring board according to the first embodiment of the present invention, FIG. 3 is a partially-enlarged view of part III of FIG. 2, FIG. 4 is a cross-sectional view along line IV-IV of FIG. 3, FIG. 5 is a cross-sectional view for describing a first conductor line according to the first embodiment of the present invention, FIG. 6 is a cross-sectional view along line VI-VI of FIG. 3, FIG. 7 is an explanatory view for describing an aperture ratio, FIG. 8 is a cross-sectional view along line VIII-VIII of FIG. 3, and FIG. 9 is a plan view illustrating a first modified example of the wiring board according to the first embodiment of the present invention.

A touch sensor 1 comprising a wiring body 4 of the present embodiment is, for example, a touch input device used in a touch panel or touch pad of a capacitance-type, etc. A display device, such as a liquid crystal display, organic EL display, and electronic paper, is incorporated in the touch input device. As illustrated in FIG. 1 and FIG. 2, the touch sensor 1 comprises: a wiring board 2 that comprises a base material 3 and a wiring body 4; and mesh-like electrode layers 101 and lead wire layers 102 that are laminated on the wiring board 2 (wiring body 4) via a resin layer 9.

Mesh-like electrode layers 6 of the wiring body 4 are a plurality of detection electrodes (three detection electrodes in the present embodiment) that extend in the Y-direction. The mesh-like electrode layers 101, arranged to face the mesh-like electrode layers 6, are a plurality of detection electrodes (four detection electrodes in the present embodiment) that extend in the X-direction. In the touch sensor 1, the mesh-like electrode layers 6 are connected to an external circuit via lead wire layers 7 and the mesh-like electrode layers 101 are connected to the external circuit via the lead wire layers 102. A predetermined voltage is periodically applied between the mesh-like electrode layers 6 and 101, and the operation position (touch position) of an operator on the touch sensor 1 is determined on the basis of the variation of capacitance at intersections of the two sets of mesh-like electrode layers 6 and 101.

In the present embodiment, the resin layer 9 has a similar configuration to that of an adhesion layer 5, the mesh-like electrode layers 101 have a similar configuration to that of the mesh-like electrode layers 6, and the lead wire layers 102 have a similar configuration to that of the lead wire layers 7. In the following description, therefore, detailed description of the resin layer 9, mesh-like electrode layers 101, and lead wire layers 102 will be omitted. The "wiring board 2" in the present embodiment corresponds to an example of the "wiring board" and "touch sensor" in the present invention.

Examples of the base material 3 include various materials, such as polyethylene terephthalate (PET), polyethylene naphthalate (PEN), polyimide resin (PI), polyetherimide resin (PEI), polycarbonate (PC), polyether ether ketone (PEEK), liquid-crystal polymer (LCP), cycloolefin polymer (COP), silicone resin (SI), acrylic resin, phenol resin, epoxy resin, green sheet, and glass. The base material may be formed with an easy-adhesion layer and/or an optical adjustment layer. When the wiring board 2 is used as an electrode board of a touch panel, a transparent material is selected as the material which constitutes the base material 3. The "base material 3" in the present embodiment corresponds to an example of the "support body" in the present invention.

The wiring body 4 is formed on a main surface 31 of the base material 3 and supported by the base material 3. The wiring body 4 comprises the adhesion layer 5, the mesh-like electrode layers 6, the lead wire layers 7, and boundary lines 8. The "wiring body 4" in the present embodiment corresponds to an example of the "wiring body" in the present invention.

The adhesion layer 5 as a resin layer in the present embodiment is a member that adheres to the base material 3 and the mesh-like electrode layers 6 to fix them to each other. Similarly, the adhesion layer 5 adheres to the base material 3 and the lead wire layers 7 to fix them to each other and adheres to the base material 3 and the boundary lines 8 to fix them to each other. Examples of a material that constitutes such an adhesion layer 5 include a UV-curable resin, thermoset resin, or thermoplastic resin, such as an epoxy resin, acrylic resin, polyester resin, urethane resin, vinyl resin, silicone resin, phenol resin, and polyimide resin. As illustrated in FIG. 4, FIG. 6, and FIG. 8, the adhesion layer 5 in the present embodiment is constituted of a flat part 51 that is provided on the main surface 31 of the base material 3 to have an approximately constant thickness and support parts 52 that are formed on the flat part 51.

The flat part 51 is uniformly provided to cover the main surface 31 of the base material 3 and a main surface 511 of the flat part 51 is approximately parallel to the main surface 31 of the base material 3. The thickness of the flat part 51 is preferably 5 µm to 100 µm. The support parts 52 are formed between the flat part 51 and the mesh-like electrode layers 6, between the flat part 51 and the lead wire layers 7, and between the flat part 51 and the boundary lines 8 so as to protrude toward the direction of departing from the base material 3 (+Z-direction in FIG. 3). Accordingly, the thickness (height) of the adhesion layer 5 at portions provided with the support parts 52 is larger than the thickness (height) of the adhesion layer 5 at the flat part 51.

The adhesion layer 5 is in contact with the mesh-like electrode layers 6 (specifically, contact surfaces 61 (described later)), the lead wire layers 7 (specifically, contact surfaces 71 (described later)), and the boundary lines 8 (specifically, contact surfaces 81 (described later)) at contact surfaces 522 that are upper surfaces of the support parts 52.

As illustrated in FIG. 3, the contact surfaces 522 have uneven (irregular) shapes that are complementary to contact surfaces 61, 71, and 81 having uneven shapes. As illustrated in FIG. 4, FIG. 6, and FIG. 8, also in the cross sections when viewed in the extending directions of conductor lines (first conductor lines 64 (described later), second conductor lines 74 (described later), and the boundary lines 8), the contact surfaces 61, 71, and 81 and the contact surfaces 522 have uneven shapes that are complementary to each other. For easy understanding of the wiring body 4 of the present embodiment, FIG. 4, FIG. 6, and FIG. 8 illustrate the uneven shapes of the contact surfaces 61, 71, 81 and the contact surfaces 522 in an exaggerated manner.

Each support part 52 has two linear side surfaces 521 and 521 that incline so as to come close to each other in the transverse cross-sectional view as departing from the base material 3.

The mesh-like electrode layers 6 are detection electrodes of the touch sensor 1, which extend in the Y-direction as illustrated in FIG. 2. The mesh-like electrode layers 6 are laminated on the support parts 52 of the adhesion layer 5 and formed so as to protrude toward the +Z-direction (see FIG. 4, for example). The mesh-like electrode layers 6 have a rectangular outer shape in the plan view. The "mesh-like electrode layers 6" in the present embodiment correspond to an example of the "electrode layer" in the present invention.

The mesh-like electrode layers 6 are constituted of a conductive powder and a binder resin. In the mesh-like electrode layers 6, the conductive powder exists to be approximately uniformly dispersed in the binder resin, and particles of the conductive power are in contact with one another thereby to allow the mesh-like electrode layers 6 to have conductivity. Examples of a material of the conductive powder which constitutes the mesh-like electrode layers 6 include a metal material, such as silver, copper, nickel, tin, bismuth, zinc, indium, and palladium, and a carbon-based material, such as graphite, carbon black (furnace black, acetylene black, Ketjen black), carbon nanotube, and carbon nanofiber. Metal salts that are salts of the above-described metal materials may also be used, other than the conductive powder.

Conductive powder that can be used as the conductive powder contained in the mesh-like electrode layers 6 may have a particle diameter φ of 0.5 µm or more and 2 µm or less (0.5 µm≤φ≤2 µm), for example, in accordance with the widths of conductor lines that constitute the mesh-like electrode layers 6. From the viewpoint of stabilizing the electric resistance value of the mesh-like electrode layers 6, it is preferred to use conductive powder having an average particle diameter φ that is not larger than half the widths of the first conductor lines 64 which constitute the mesh-like electrode layers 6. It is also preferred to use particles of which the specific surface area as measured by the BET method is 20 m$^2$/g or more, as the conductive powder.

When the mesh-like electrode layers 6 are required to have a relatively small electric resistance value that is not larger than a certain level, it is preferred to use a metal material as the conductive material, while when the mesh-like electrode layers 6 are accepted to have a relatively large electric resistance value that is not smaller than a certain level, a carbon-based material can be used as the conductive material. From the viewpoint of improving the haze and total luminous reflectance of a mesh film, it is preferred to use a carbon-based material as the conductive powder.

In the present embodiment, electrode layers are formed into a mesh-like shape to give optical transparency to the mesh-like electrode layers 6. In this case, conductive materials that are excellent in the conductivity but opaque, such as silver, copper, nickel and other metal materials and the above-described carbon-based materials, (opaque metal materials and opaque carbon-based materials) can be used as the conductive material which constitutes the mesh-like electrode layers 6.

Examples of the binder resin which constitutes the mesh-like electrode layers 6 include acrylic resin, polyester resin, epoxy resin, vinyl resin, urethane resin, phenol resin, polyimide resin, silicone resin, and fluorine resin. In an alternative embodiment, the binder resin may be omitted from the material which constitutes the mesh-like electrode layers 6.

Such mesh-like electrode layers 6 are formed by applying a conductive paste and curing it. Specific examples of the conductive paste include a conductive paste that is composed by mixing a conductive powder, a binder resin, water or solvent, and various additives. Examples of the solvent contained in the conductive paste include α-terpineol, butyl carbitol acetate, butyl carbitol, 1-decanol, butyl cellosolve, diethylene glycol monoethyl ether acetate, and tetradecane.

As illustrated in FIG. 3, each mesh-like electrode layer 6 is configured such that a plurality of first conductor lines 64*a* and 64*b* having conductivity intersects with one another, and has a shape as a whole in which a plurality of quadrangle-shaped first unit meshes 65 is arranged to repeat. The "first conductor lines 64*a* and 64*b*" in the present embodiment correspond to an example of the "first conductor lines" in the present invention and the "first unit meshes 65" in the present embodiment correspond to an example of the "unit meshes" in the present invention. In the present description, the "first conductor lines 64*a*" and the "first conductor lines 64*b*" may be collectively referred to as "first conductor lines 64," as necessary.

As illustrated in FIG. 4, each outer shape of the first conductor lines 64 of the present embodiment is constituted of a contact surface 61, a top surface 62, and two side surfaces 63 and 63. The contact surface 61 is a surface that is in contact with the adhesion layer 5 (specifically, with the contact surface 522). The mesh-like electrode layer 6 of the present embodiment is supported by the base material 3 via the adhesion layer 5, in which case the contact surface 61 is a surface that is located at the base material 3 side with respect to the top surface 62. The contact surface 61 is an uneven surface with fine unevennesses in the transverse cross section. The uneven shape of the contact surface 61 is formed based on the surface roughness of the contact surface 61. The surface roughness of the contact surface 61 will be described later in more detail.

On the other hand, the top surface 62 is a surface opposite to the contact surface 61 and is provided as a surface that is substantially parallel to the main surface 31 of the base material 3 (or to the surface of the adhesion layer 5 facing the main surface 31). The top surface 62 includes a linear top surface flat part 621. In the cross section of the mesh-like electrode layer 6 in its width direction, the width of the top surface flat part 621 is not smaller than half the width of the top surface 62. In the present embodiment, approximately the entire top surface 62 is the top surface flat part 621. The flatness of the top surface flat part 621 is 0.5 μm or less. The flatness can be defined in accordance with a JIS method (JIS B0621 (1984)).

The flatness of the top surface flat part 621 is obtained using a contactless-type measurement method with laser light. Specifically, a measuring object is irradiated with strip-like laser light and the reflected light is focused on an imaging element (e.g. two-dimensional CMOS) to measure the flatness. The method of calculating the flatness may be a method that includes setting flat surfaces on an object surface so as to pass through three points separated from one another as much as possible and calculating the maximum value of deviation as the flatness (maximum deviation-type flatness). The methods of measuring and calculating the flatness are not particularly limited to the above. For example, the method of measuring the flatness may be a contact-type measurement method using a dial gauge or other appropriate gauge. The method of calculating the flatness may also be a method that includes interposing an object surface between parallel flat surfaces and calculating a value of space generated due to the interposition as the flatness (maximum slope-type flatness).

As illustrated in FIG. 4, each side surface 63 bridges the contact surface 61 and the top surface 62. The side surface 63 connects to the top surface 62 at one end part 631 and connects to the contact surface 61 at the other end part 632.

The side surfaces 63 and 63 are linear surfaces that incline so as to come close to each other in the transverse cross-sectional view as departing from the adhesion layer 5. In the present embodiment, the side surfaces 63 and 63 are continuous with the side surfaces 521 and 521 at portions that connect to the interface between the contact surfaces 522 and 61, in the transverse cross-sectional view. The side surfaces 63 and 63 are in a linear shape in the transverse cross-sectional view and formed to incline so as to come close to each other as departing from the adhesion layer 5. The first conductor line 64 is in a tapered shape that narrows as departing from the adhesion layer 5 in the transverse cross-sectional view of the first conductor line 64.

Each side surface 63 includes a side surface flat part 633 in the cross section of the first conductor line 64 in its width direction. The side surface flat part 633 represents a linear portion that exists on the side surface 63 in the transverse cross-sectional view of the first conductor line 64. The flatness of the side surface flat part 633 is 0.5 μm or less. The side surface 63 of the present embodiment extends on a virtual straight line (not illustrated) passing through both ends 631 and 632 of the side surface 63, and approximately the entire side surface 63 is the side surface flat part 633.

The shape of the side surface 63 is not particularly limited to the above. For example, the side surface 63 may be in an arc shape that protrudes toward outside in the transverse cross-sectional view of the first conductor line 64. In this case, the side surface 63 exists outside the virtual straight line passing through the both ends 631 and 632. Thus, the side surface 63 is preferably in a shape that does not exist inside the virtual straight line passing through the both ends in the transverse cross-sectional view of the first conductor line 64. For example, when the width of a conductor line that constitutes the mesh-like electrode layer increases gradually as approaching the first resin layer in the transverse cross-ssectional view of the conductor line, the side surface is preferably not in an arc shape that is depressed toward inside (i.e. not in a shape in which the lower part of the conductor line widens in a divergent fashion).

From the viewpoint of tightly fixing the mesh-like electrode layer 6 and the adhesion layer 5 to each other, the surface roughness of the contact surface 61 of the mesh-like electrode layer 6 in the present embodiment is preferably relatively rougher than the surface roughness of the top surface 62. Since the top surface 62 includes the top surface flat part 621 in the present embodiment, the above relative relationship of the surface roughness (relationship that the surface roughness of the contact surface 61 is relatively larger than the surface roughness of the top surface 62) is established. Specifically, the surface roughness Ra of the contact surface 61 is preferably about 0.1 μm to 3.0 μm while the surface roughness Ra of the top surface 62 is preferably about 0.001 μm to 1.0 μm. The surface roughness Ra of the contact surface 61 is more preferably 0.1 μm to 0.5 μm and the surface roughness Ra of the top surface 62 is furthermore preferably 0.001 μm to 0.3 μm. The relation of the surface roughness of the top surface 62 to the surface roughness of the contact surface 61 is preferably 0.01 or more and less than 1 and more preferably 0.1 or more and less than 1. The surface roughness of the top surface 62 is preferably ⅕ or less of the width (maximum width) of the first conductor line 64. Such surface roughness can be measured in accordance with a JIS method (JIS B0601 (revised on Mar. 21, 2013)). The measurement of the surface roughness of the contact surface 61 and the surface roughness of the top surface 62 may be performed along the width direction of the first conductor line 64 and may also be performed along the extending direction of the first conductor line 64.

As used herein, the "surface roughness Ra" refers to "arithmetic average roughness Ra" as described in the JIS method (JIS B0601 (revised on Mar. 21, 2013)). The "arithmetic average roughness Ra" represents a roughness parameter that is obtained by shutting off long-wavelength components (waviness components) from a profile curve. Separation of the waviness components from the profile curve may be performed on the basis of the measurement condition which is necessary for obtaining a form (such as the size of an object, for example).

In the present embodiment, the side surface 63 also includes the side surface flat part 633. The surface roughness of the contact surface 61 is therefore relatively larger than that of the side surface 63, as in the top surface 62. While the surface roughness Ra of the contact surface 61 is 0.1 μm to 3.0 μm, the surface roughness Ra of the side surface 63 is preferably 0.001 μm to 1.0 μm and more preferably 0.001 μm to 0.3 μm. The measurement of the surface roughness of the side surface 63 may be performed along the width direction of the first conductor line 64 and may also be performed along the extending direction of the first conductor line 64.

When the relative relationship of the surface roughness between the contact surface 61 and other surfaces than the contact surface 61 (top surface 62 and side surfaces 63) satisfies the above-described relationship, the diffuse reflectance at the other surfaces than the contact surface 61 is smaller than the diffuse reflectance at the contact surface 61. In this case, the ratio of the diffuse reflectance at the other surfaces than the contact surface 61 to the diffuse reflectance at the contact surface 61 is preferably 0.1 or more and less than 1 and more preferably 0.3 or more and less than 1.

An example of the shape of a conductor line having the above-described relative relationship of the surface roughness between the contact surface and other surfaces than the contact surface will be described with reference to FIG. 5. In the contact surface 61B of a mesh-like electrode layer 6B that is constituted by conductive particles M and a binder resin B, a part of the conductive particles M protrudes from the binder resin B in the transverse cross-sectional view of a first conductor line 64B. This allows the contact surface 61B to have an uneven shape. On the other hand, in the top surface 62B and the side surfaces 63B, the binder resin B gets into spaces between the conductive particles M in the transverse cross-sectional view of the first conductor line 64B. Slightly exposed portions of the conductive particles M are scattered about on the top surface 62B and the side surfaces 63B, but the binder resin B covers the conductive particles M. This allows the top surface 62B to include a linear top surface flat part 621B and allows the side surfaces 63B to include linear side surface flat parts 633B. In this case, the surface roughness of the contact surface 61B is relatively larger than the surface roughness of the top surface 62B and also relatively larger than the surface roughness of the side surfaces 63B. Thus, the binder resin B covers the conductive particles M in the side surfaces 63B, so that the electric insulation is improved between adjacent first conductor lines 64B and the occurrence of migration is suppressed.

Referring again to FIG. 3, in the mesh-like electrode layer 6 of the present embodiment, the first conductor lines 64 are arranged as below. That is, each first conductor line 64a extends linearly along a direction inclined by +45° with respect to the X-direction (this direction will be also simply referred to as a "first direction," hereinafter), and the plurality of the first conductor lines 64a is arranged at a regular pitch $P_{11}$ in a direction that is substantially orthogonal to the first direction (this direction will be also simply referred to as a "second direction," hereinafter). On the other hand, each first conductor line 64b extends linearly along the second direction, and the plurality of the first conductor lines 64b is arranged at a regular pitch $P_{12}$ in the first direction. The first conductor lines 64a and 64b are orthogonal to one another and the mesh-like electrode layer 6 is thereby formed in which the quadrangle-shaped (rhombus-shaped) first unit meshes 65 are arranged to repeat. As used in the present description, the pitch refers to a center-to-center distance.

The structure of the mesh-like electrode layer 6 is not particularly limited to the above. For example, the pitch $P_{11}$ of the first conductor lines 64a is substantially the same as the pitch $P_{12}$ of the first conductor lines 64b in the present embodiment ($P_{11}=P_{12}$), but the present invention is not limited to this, and the pitch $P_{11}$ of the first conductor lines 64a may be different from the pitch $P_{12}$ of the first conductor lines 64b ($P_{11}\neq P_{12}$). In this case, the first unit meshes have a rectangular outer shape.

In the present embodiment, the first direction, along which the first conductor lines 64a extend, is a direction inclined by +45° with respect to the X-direction while the second direction, along which the first conductor lines 64b extend, is a direction that is substantially orthogonal to the first direction, but the extending directions of the first and second directions (i.e. an angle of the first direction with respect to the X-axis and an angle of the second direction with respect to the X-axis) can be freely set.

The shape of the first unit meshes 65 of the mesh-like electrode layer 6 may have a certain geometrical pattern. That is, the shape of the first unit meshes 65 may be a triangle, such as a regular triangle, isosceles triangle and right triangle, and may also be a quadrangle, such as a rectangle, square, rhombus, parallelogram and trapezoid. The shape of the first unit meshes 65 may also be an n-polygon, such as a hexagon, octagon, dodecagon and icosagon, circle, ellipsoid, and star-shape.

Thus, in the mesh-like electrode layer 6, a geometrical pattern obtained by repeating any of various figure units can be used as the shape of the first unit meshes 65 of the mesh-like electrode layer 6. In the present embodiment, the first conductor lines 64 are in a linear shape, but the present invention is not particularly limited to this, and they may be in a specific shape, such as a curved shape, horseshoe-like shape and zigzag shape.

As illustrated in FIG. 2, the lead wire layers 7 are provided to correspond to the mesh-like electrode layers 6. In the present embodiment, three lead wire layers 7 are formed for the three mesh-like electrode layers 6. The lead wire layers 7 are led out from the −Y-direction side in the figure of the mesh-like electrode layers 6 via the boundary lines 8. The lead wire layers 7 are formed integrally with respective mesh-like electrode layers 6 using the same material as the above-described material of the mesh-like electrode layers 6.

As used herein, the term "integrally with" refers to a situation in which a member and another member are not separated from each other and they are formed as a one-body structure using the same material (such as using conductive particles of the same particle diameter and the same binder resin). In the outer edges of the mesh-like electrode layers 6, locations at which the lead wire layers 7 are provided are not particularly limited.

Each lead wire layer 7 is in contact with the corresponding boundary line 8 at one end part 76. The lead wire layer 7 has substantially the same width between the end part 76 and a portion (curved part 77) at which the lead wire layer 7 curves first. The extending direction of the lead wire layer 7 varies at the curved part 77 in the plan view. As illustrated in FIG. 2, the lead wire layer 7 is led out from the end part 76 to the first curved part 77 in a direction that is substantially identical to the extending direction of the mesh-like electrode layer 6. The lead direction of the lead wire layer 7 is not particularly limited to the above, and the lead wire layer 7 may be led out from the end part 76 to the first curved part 77 in a direction that crosses the extending direction of the mesh-like electrode layer 6. Thus, in the present embodiment, the width of the lead wire layer 7 is not large in the vicinity of a location at which the lead wire layer 7 and the boundary line 8 are connected to each other. This can make the lead wire layer 7 less likely to be visually recognized and it is therefore possible to suppress the deterioration in visibility of the touch sensor 1. Moreover, when the width of the lead wire layer 7 does not vary between the end part 76 and the curved part 77, the region in which the lead wire layer 7 is formed can be reduced.

As illustrated in FIG. 3, each lead wire layer 7 is configured such that a plurality of second conductor lines 74a and 74b having conductivity intersects with one another, and has a shape as a whole in which a plurality of quadrangle-shaped second unit meshes 75 is arranged to repeat. The "second conductor lines 74a and 74b" in the present embodiment correspond to an example of the "second conductor lines" in the present invention. In the present description, the "second conductor lines 74a" and the "second conductor lines 74b" may be collectively referred to as "second conductor lines 74," as necessary.

As illustrated in FIG. 6, each second conductor line 74 of the present embodiment is constituted of a contact surface 71, a top surface 72, and two side surfaces 73 and 73, as in the mesh-like electrode layer 6. The contact surface 71 is a surface that is in contact with the adhesion layer 5. The lead wire layer 7 of the present embodiment is supported by the base material 3 via the adhesion layer 5, in which case the contact surface 71 is a surface that is located at the base material 3 side with respect to the top surface 72. The contact surface 71 is an uneven surface with fine unevennesses in the transverse cross section. The uneven shape of the contact surface 71 is formed based on the surface roughness of the contact surface 71. The surface roughness of the contact surface 71 will be described later in more detail.

On the other hand, the top surface 72 is a surface opposite to the contact surface 71 and is provided as a surface that is substantially parallel to the main surface 31 of the base material 3 (or to the surface of the adhesion layer 5 facing the main surface 31). The top surface 72 includes a linear top surface flat part 721. In the cross section of the mesh-like electrode layer 6 in its width direction, the width of the top surface flat part 721 is not smaller than half the width of the top surface 72. In the present embodiment, approximately the entire top surface 72 is the top surface flat part 721. The flatness of the top surface flat part 721 is 0.5 µm or less. The same method as the above-described method of measuring the flatness of the top surface flat part 621 is used as the method of measuring the flatness of the top surface flat part 721.

As illustrated in FIG. 6, each side surface 73 bridges the contact surface 71 and the top surface 72. The side surface 73 connects to the top surface 72 at one end part 731 and connects to the contact surface 71 at the other end part 732.

The side surfaces 73 and 73 are linear surfaces that incline so as to come close to each other in the transverse cross-sectional view as departing from the adhesion layer 5. In the present embodiment, the side surfaces 73 and 73 are continuous with the side surfaces 521 and 521 at portions that connect to the interface between the contact surfaces 522 and 71, in the transverse cross-sectional view. The side surfaces 73 and 73 are in a linear shape in the transverse cross-sectional view and formed to incline so as to come close to each other as departing from the adhesion layer 5. The second conductor line 74 is in a tapered shape that narrows as departing from the adhesion layer 5 in the transverse cross-sectional view of the second conductor line 74.

Each side surface 73 includes a side surface flat part 733 in the cross section of the second conductor line 74 in its width direction. The side surface flat part 733 represents a linear portion that exists on the side surface 73 in the transverse cross-sectional view of the second conductor line 74. The flatness of the side surface flat part 733 is 0.5 µm or less. The side surface 73 of the present embodiment extends on a virtual straight line (not illustrated) passing through both ends 731 and 732 of the side surface 73, and approximately the entire side surface 73 is the side surface flat part 733.

The shape of the side surface 73 is not particularly limited to the above. For example, the side surface 73 may be in an arc shape that protrudes toward outside in the transverse cross-sectional view of the second conductor line 74. In this case, the side surface 73 exists outside the virtual straight line passing through the both ends 731 and 732. Thus, the side surface 73 is preferably in a shape that does not exist inside the virtual straight line passing through the both ends in the transverse cross-sectional view of the second conductor line 74. For example, when the width of a conductor line that constitutes the lead wire layer increases gradually as approaching the first resin layer in the transverse cross-sectional view of the conductor line, the side surface is preferably not in an arc shape that is depressed toward inside (i.e. not in a shape in which the lower part of the conductor line widens in a divergent fashion).

From the viewpoint of tightly fixing the lead wire layer 7 and the adhesion layer 5 to each other, the surface roughness of the contact surface 71 of the lead wire layer 7 in the present embodiment is preferably relatively rougher than the surface roughness of the top surface 72, as in the above-described mesh-like electrode layer 6. Since the top surface 72 includes the top surface flat part 721 in the present embodiment, the above relative relationship of the surface roughness (relationship that the surface roughness of the contact surface 71 is relatively larger than the surface roughness of the top surface 72) is established. Specifically, the surface roughness Ra of the contact surface 71 is preferably about 0.1 µm to 3.0 µm while the surface roughness Ra of the top surface 72 is preferably about 0.001 µm to 1.0 µm. The surface roughness Ra of the contact surface 71 is more preferably 0.1 µm to 0.5 µm and the surface roughness Ra of the top surface 72 is furthermore preferably 0.001 μm to 0.3 μm. The relation of the surface roughness of the top surface 72 to the surface roughness of the contact surface 71 is preferably 0.01 or more and less than 1 and more preferably 0.1 or more and less than 1. The surface roughness of the top surface 72 is preferably ⅕ or less of the width (maximum width) of the second conductor line 74. The measurement of the surface roughness of the contact surface 71 and the surface roughness of the top surface 72 may be performed along the width direction of the second conductor line 74 and may also be performed along the extending direction of the second conductor line 74.

In the present embodiment, the side surface 73 also includes the side surface flat part 733. The surface roughness of the contact surface 71 is therefore relatively larger than that of the side surface 73, as in the top surface 72. While the surface roughness Ra of the contact surface 71 is 0.1 μm to 3.0 μm, the surface roughness Ra of the side surface 73 is preferably 0.001 μm to 1.0 μm and more preferably 0.001 μm to 0.3 μm. The measurement of the surface roughness of the side surface 73 may be performed along the width direction of the second conductor line 74 and may also be performed along the extending direction of the second conductor line 74.

When the relative relationship of the surface roughness between the contact surface 71 and other surfaces than the contact surface 71 (top surface 72 and side surfaces 73) satisfies the above-described relationship, the diffuse reflectance at the other surfaces than the contact surface 71 is smaller than the diffuse reflectance at the contact surface 71. In this case, the ratio of the diffuse reflectance at the other surfaces than the contact surface 71 to the diffuse reflectance at the contact surface 71 is preferably 0.1 or more and less than 1 and more preferably 0.3 or more and less than 1.

A similar shape to that of the first conductor line illustrated in FIG. 5 can be exemplified as an example of the shape of a second conductor line having the above-described relative relationship of the surface roughness between the contact surface and other surfaces than the contact surface. That is, although not particularly illustrated, in the contact surface of a second conductor line, a part of conductive particles protrudes from a binder resin in the transverse cross-sectional view of the second conductor line. This allows the contact surface of the second conductor line to have an uneven shape. On the other hand, in the top surface and side surfaces of the second conductor line, the binder resin gets into spaces between the conductive particles in the transverse cross-sectional view of the second conductor line. Slightly exposed portions of the conductive particles are scattered about on the top surface and the side surfaces, but the binder resin covers the conductive particles. This allows the top surface of the second conductor line to include a linear portion (i.e. a top surface flat part) and allows the side surfaces of the second conductor line to include linear portions (i.e. side surface flat parts). In this case, the surface roughness of the contact surface of the second conductor line is relatively larger than the surface roughness of the top surface of the second conductor line and also relatively larger than the surface roughness of the side surfaces of the second conductor line. Thus, the binder resin covers the conductive particles in the side surfaces of the second conductor line, so that the electric insulation is improved between adjacent second conductor lines and the occurrence of migration is suppressed. The shape of the second conductor line is not particularly limited to the above.

Referring again to FIG. 3, in the lead wire layer 7 of the present embodiment, the second conductor lines 74 are arranged as below. That is, each second conductor line 74a extends linearly along the first direction, and the plurality of the second conductor lines 74a is arranged at a regular pitch $P_{21}$ in the second direction. On the other hand, each second conductor line 74b extends linearly along the second direction, and the plurality of the second conductor lines 74b is arranged at a regular pitch $P_{22}$ in the first direction. The second conductor lines 74a and 74b are orthogonal to one another and the lead wire layer 7 is thereby formed in which the quadrangle-shaped (rhombus-shaped) second unit meshes 75 are arranged to repeat.

The structure of the lead wire layer 7 is not particularly limited to the above. For example, the pitch $P_{21}$ of the second conductor lines 74a is substantially the same as the pitch $P_{22}$ of the second conductor lines 74b in the present embodiment ($P_{21}=P_{22}$), but the present invention is not particularly limited to this, and the pitch $P_{21}$ of the second conductor lines 74a may be different from the pitch $P_{22}$ of the second conductor lines 74b ($P_{21} \neq P_{22}$). In this case, the second unit meshes have a rectangular outer shape.

In the lead wire layer 7, a geometrical pattern obtained by repeating any of various figure units can be used as the shape of the second unit meshes 75, as in the mesh-like electrode layer 6. In the present embodiment, the second conductor lines 74 are in a linear shape, but the present invention is not particularly limited to this, and they may be in a specific shape, such as a curved shape, horseshoe-like shape and zigzag shape.

In the wiring body 4 of the present embodiment, as described above, both the mesh-like electrode layer 6 and the lead wire layer 7 are formed in a mesh-like shape in which a plurality of quadrangle-shaped unit meshes is arranged. In this case of the present embodiment, from the viewpoint of improving the visibility in the mesh-like electrode layer 6 and suppressing the increase in the electric resistance value of the lead wire layer 7, a following Expression (7) is established (see FIG. 3, FIG. 4, and FIG. 6).

$$W_{11} < W_{21} \quad (7)$$

In the above Expression (7), $W_{11}$ represents a width of the first conductor lines 64 in a direction orthogonal to the extending direction of the first conductor lines 64 and $W_{21}$ represents a width of the second conductor lines 74 in a direction orthogonal to the extending direction of the second conductor lines 74. The "width" as used herein refers to an average maximum width of conductor lines in a direction orthogonal to the extending direction of the conductor lines.

A specific value of such a width $W_{11}$ of the first conductor lines 64 is preferably 50 nm to 1,000 μm, more preferably 500 nm to 150 μm, further preferably 1 μm to 10 μm, and furthermore preferably 1 μm to 5 μm. A specific value of the width $W_{21}$ of the second conductor lines 74 is preferably 1 μm to 500 μm, more preferably 3 μm to 100 μm, and further preferably 5 μm to 20 μm. Depths of the first conductor lines 64 and second conductor lines 74 are preferably 100 nm to 300 μm and more preferably 1 μm to 50 μm.

In the wiring body 4 of the present embodiment, a following Expression (8) is preferably established.

$$A_1 > A_2 \quad (8)$$

In the above Expression (8), $A_1$ represents an aperture ratio of the electrode layer and $A_2$ represents an aperture ratio of the lead wire layer.

Specifically, from the viewpoint of improving the optical transparency of transmitting light from a light source located below the wiring body 4, the aperture ratio of the mesh-like electrode layer 6 is preferably 85% or more and less than 100% and more preferably 90% or more and less than 100%. On the other hand, from the viewpoint of reducing the difference in rigidity between the mesh-like electrode layer 6 and the lead wire layer 7 and improving the durability of the lead wire layer 7, the aperture ratio of the lead wire layer 7 is preferably 50% or less and more preferably 10% or more.

The "aperture ratio" as used herein refers to a ratio that is represented by a following Expression (9) (see FIG. 7).

$$(\text{Aperture ratio}) = b \times b / (a \times a) \qquad (9)$$

In the above Expression (9), "a" represents a pitch between a conductor line 400 and an adjacent conductor line 400 (distance between center lines CLs) and "b" represents a distance between the conductor line 400 and the adjacent conductor line 400.

In the wiring body 4 of the present embodiment, a following Expression (10) is preferably established (see FIG. 3).

$$P_{11}, P_{12} > P_{21}, P_{22} \qquad (10)$$

In the above Expression (10), $P_{11}$ represents a pitch between adjacent first conductor lines 64a, $P_{12}$ represents a pitch between adjacent first conductor lines 64b, $P_{21}$ represents a pitch between adjacent second conductor lines 74a, and $P_{22}$ represents a pitch between adjacent second conductor lines 74b. Satisfaction of the above Expression (10) can suppress increase in the electric resistance value of the lead wire layer 7.

In the wiring body 4, a following Expression (11) is preferably established.

$$D_1 > W_{31} \qquad (11)$$

In the above Expression (11), $D_1$ represents a maximum value of the width of the first unit meshes 65 in a direction orthogonal to the extending direction of the mesh-like electrode layer 6 and $W_{31}$ represents a width of the end part 76 of the lead wire layer 7 in a direction orthogonal to the extending direction of the lead wire layer 7. Satisfaction of the above Expression (11) can further improve the visibility in the mesh-like electrode layer 6.

In FIG. 3, for easy-to-understand description of the mesh shape of the lead wire layer 7, the width of the end part 76 of the lead wire layer 7 is illustrated as being larger than the maximum value of the width of the first unit meshes 65, but in practice, the width of the end part 76 of the lead wire layer 7 is smaller than the maximum value of the width of the first unit meshes 65, as illustrated in FIG. 2 (i.e., the above Expression (11) is established).

In the present description, the width of the end part 76 of the lead wire layer 7 is 1 mm or less ($W_{31} \leq 1$ mm).

In the present embodiment, a surface obtained by averaging the uneven shape of the contact surface 71 of the second conductor line 74 is moderately curved toward the direction of departing from the base material 3 as compared with a surface obtained by averaging the uneven shape of the contact surface 61 of the first conductor line 64 (see FIG. 4 and FIG. 6).

In the present embodiment, therefore, following Expressions (12) and (13) are established.

$$S_1 < S_2 \qquad (12)$$

$$R_1 < R_2 \qquad (13)$$

In the above Expression (12), $S_1$ represents a thickness (average maximum thickness in the cross-sectional view across the entire plane) of the adhesion layer 5 at an adhesion portion (adhesion surface) with the contact surface 61 of the first conductor line 64 and $S_2$ represents a thickness (average maximum thickness in the cross-sectional view across the entire plane) of the adhesion layer 5 at an adhesion portion (adhesion surface) with the contact surface 71 of the second conductor line 74. In the above Expression (13), $R_1$ represents a curvature of a surface (first adhesion surface) obtained by averaging the contact surface 61 of the first conductor line 64 and $R_2$ represents a curvature of a surface (second adhesion surface) obtained by averaging the contact surface 71 of the second conductor line 74.

When the above Expressions (12) and (13) are established, the contact area between the second conductor line 74 and the support part 52 of the adhesion layer 5 can relatively increase to improve the interfacial adhesion between the second conductor line 74 and the support part 52.

As used herein, the "average maximum thickness in the cross-sectional view across the entire plane" refers to a value obtained through sampling a plurality of cross-sections along the width direction of each conductor line across the entire extending direction of the conductor line and averaging maximum thicknesses obtained for respective cross-sections. Examples of the above conductor line include the first conductor line 64 and the second conductor line 74. The above conductor line may be appropriately selected in accordance with the parameter to be obtained.

As illustrated in FIG. 3, each boundary line 8 is a line-like portion extending along the X-direction and is interposed between the mesh-like electrode layer 6 and the lead wire layer 7. The boundary line 8 is disposed to correspond to a short side (end part at the side perpendicular to the extending direction of the mesh-like electrode layer 6) of the mesh-like electrode layer 6 having a rectangular outer shape. The boundary line 8 is formed integrally with the mesh-like electrode layer 6 using the same material as that of the mesh-like electrode layer 6. As a result, in the present embodiment, the mesh-like electrode layer 6, the lead wire layer 7, and the boundary line 8 are constituted of a material having the same composition and they are formed integrally on the base material 3.

The boundary line 8 of the present embodiment is in a linear shape corresponding to the short side of the rectangular mesh-like electrode layer 6, but is not particularly limited to this, and may also be in a specific shape, such as a zigzag shape (see FIG. 9), curved shape, and horseshoe-like shape. Such a nonlinear shape of a boundary line 8B can suppress the concentration of stress. In this case, when a wiring body 4B is used for a curved surface, the breakage of the boundary line 8B can be suppressed even if the boundary line 8B is bent.

The "boundary line 8" in the present embodiment corresponds to an example of the boundary line in the present invention.

As illustrated in FIG. 8, the boundary line 8 of the present embodiment is constituted of a contact surface 81, a top surface 82, and two side surfaces 83 and 83, as in the mesh-like electrode layer 6 and the lead wire layer 7. The contact surface 81 is a surface that is in contact with the adhesion layer 5. The boundary line 8 of the present embodiment is supported by the base material 3 via the adhesion layer 5, in which case the contact surface 81 is a surface that is located at the base material 3 side with respect to the top surface 82. The contact surface 81 is an uneven surface with fine unevenesses in the transverse cross section. The uneven shape of the contact surface 81 is formed based on the surface roughness of the contact surface 81. The surface roughness of the contact surface 81 will be described later in more detail.

On the other hand, the top surface 82 is a surface opposite to the contact surface 81 and is provided as a surface that is substantially parallel to the main surface 31 of the base material 3 (or to the surface of the adhesion layer 5 facing the main surface 31). The top surface 82 includes a linear top surface flat part 821. In the cross section of the boundary line 8 in its width direction, the width of the top surface flat part 821 is not smaller than half the width of the top surface 82. In the present embodiment, approximately the entire top surface 82 is the top surface flat part 821. The flatness of the top surface flat part 821 is 0.5 μm or less. The same method as the above-described method of measuring the flatness of the top surface flat part 621 is used as the method of measuring the flatness of the top surface flat part 821.

As illustrated in FIG. 8, each side surface 83 bridges the contact surface 81 and the top surface 82. The side surface 83 connects to the top surface 82 at one end part 831 and connects to the contact surface 81 at the other end part 832.

The side surfaces 83 and 83 are linear surfaces that incline so as to come close to each other in the transverse cross-sectional view as departing from the adhesion layer 5. In the present embodiment, the side surfaces 83 and 83 are continuous with the side surfaces 521 and 521 at portions that connect to the interface between the contact surfaces 522 and 81, in the transverse cross-sectional view. The side surfaces 83 and 83 are in a linear shape in the transverse cross-sectional view and formed to incline so as to come close to each other as departing from the adhesion layer 5. The boundary line 8 is in a tapered shape that narrows as departing from the adhesion layer 5 in the transverse cross-sectional view of the boundary line 8.

Each side surface 83 includes a side surface flat part 833 in the cross section of the boundary line 8 in its width direction. The side surface flat part 833 represents a linear portion that exists on the side surface 83 in the transverse cross-sectional view of the boundary line 8. The flatness of the side surface flat part 833 is 0.5 μm or less. The side surface 83 of the present embodiment extends on a virtual straight line passing through both ends 831 and 832 of the side surface 83, and approximately the entire side surface 83 is the side surface flat part 833.

The shape of the side surface 83 is not particularly limited to the above. For example, the side surface 83 may be in an arc shape that protrudes toward outside in the transverse cross-sectional view of the boundary line 8. In this case, the side surface 83 exists outside the virtual straight line passing through the both ends 831 and 832. Thus, the side surface 83 is preferably in a shape that does not exist inside the virtual straight line passing through the both ends in the transverse cross-sectional view of the boundary line 8. For example, when the width of the boundary line increases gradually as approaching the first resin layer in the transverse cross-sectional view of a conductor line that constitutes the boundary line, the side surface is preferably not in an arc shape that is depressed toward inside (i.e. not in a shape in which the lower part of the conductor line widens in a divergent fashion).

From the viewpoint of tightly fixing the boundary line 8 and the adhesion layer 5 to each other, the surface roughness of the contact surface 81 of the boundary line 8 in the present embodiment is preferably relatively rougher than the surface roughness of the top surface 82, as in the above-described mesh-like electrode layer 6 and lead wire layer 7. Since the top surface 82 includes the top surface flat part 821 in the present embodiment, the above relative relationship of the surface roughness (relationship that the surface roughness of the contact surface 81 is relatively larger than the surface roughness of the top surface 82) is established. Specifically, the surface roughness Ra of the contact surface 81 is preferably about 0.1 μm to 3.0 μm while the surface roughness Ra of the top surface 82 is preferably about 0.001 μm to 1.0 μm. The surface roughness Ra of the contact surface 81 is more preferably 0.1 μm to 0.5 μm and the surface roughness Ra of the top surface 82 is furthermore preferably 0.001 μm to 0.3 μm. The relation of the surface roughness of the top surface 82 to the surface roughness of the contact surface 81 is preferably 0.01 or more and less than 1 and more preferably 0.1 or more and less than 1. The surface roughness of the top surface 82 is preferably ⅕ or less of the width (maximum width) of the boundary line 8. The measurement of the surface roughness of the contact surface 81 and the surface roughness of the top surface 82 may be performed along the width direction of the boundary line 8 and may also be performed along the extending direction of the boundary line 8.

In the present embodiment, the side surface 83 also includes the side surface flat part 833. The surface roughness of the contact surface 81 is therefore relatively larger than that of the side surface 83, as in the top surface 82. While the surface roughness Ra of the contact surface 81 is 0.1 μm to 3.0 μm, the surface roughness Ra of the side surface 83 is preferably 0.001 μm to 1.0 μm and more preferably 0.001 μm to 0.3 μm. The measurement of the surface roughness of the side surface 83 may be performed along the width direction of the boundary line 8 and may also be performed along the extending direction of the boundary line 8.

When the relative relationship of the surface roughness between the contact surface 81 and other surfaces than the contact surface 81 (top surface 82 and side surfaces 83) satisfies the above-described relationship, the diffuse reflectance at the other surfaces than the contact surface 81 is smaller than the diffuse reflectance at the contact surface 81. In this case, the ratio of the diffuse reflectance at the other surfaces than the contact surface 81 to the diffuse reflectance at the contact surface 81 is preferably 0.1 or more and less than 1 and more preferably 0.3 or more and less than 1.

A similar shape to that of the first conductor line illustrated in FIG. 5 can be exemplified as an example of the shape of a boundary line having the above-described relative relationship of the surface roughness between the contact surface and other surfaces than the contact surface. That is, although not particularly illustrated, in the contact surface of a boundary line, a part of conductive particles protrudes from a binder resin in the transverse cross-sectional view of the boundary line. This allows the contact surface of the boundary line to have an uneven shape. On the other hand, in the top surface and side surfaces of the boundary line, the binder resin gets into spaces between the conductive particles in the transverse cross-sectional view of the boundary line. Slightly exposed portions of the conductive particles are scattered about on the top surface and the side surfaces, but the binder resin covers the conductive particles. This allows the top surface of the boundary line to include a linear portion (i.e. a top surface flat part) and allows the side surfaces of the boundary line to include linear portions (i.e. side surface flat parts). In this case, the surface roughness of the contact surface of the boundary line is relatively larger than the surface roughness of the top surface of the boundary line and also relatively larger than the surface roughness of the side surfaces of the boundary line. Thus, the binder resin covers the conductive particles in the side surfaces of the boundary line, so that the electric insulation is improved between adjacent boundary lines and the occurrence of migration is suppressed. The shape of the boundary line is not particularly limited to the above.

In the present embodiment, a surface obtained by averaging the uneven shape of the contact surface 81 of the boundary line 8 is moderately curved toward the direction of departing from the base material 3, as in the lead wire layer 7. Such a width $W_{41}$ of the boundary line 8 is, for example, preferably 1 μm to 500 μm, more preferably 3 μm to 100 μm, and further preferably 5 μm to 20 μm. The depth of the boundary line 8 is preferably 100 nm to 300 μm and more preferably 1 μm to 50 μm.

As illustrated in FIG. 2, the boundary line 8 of the present embodiment is formed such that the length $L_{11}$ of the boundary line 8 in its extending direction (i.e. X-direction) is substantially identical to the width $W_{51}$ of the mesh-like electrode layer 6 in a direction (i.e. X-direction) perpendicular to the extending direction of the mesh-like electrode layer 6 ($L_{11}=W_{51}$).

The length $L_1$ of the boundary line 8 is not particularly limited to the above, provided that a following Expression (14) is established.

$$L_{11} > W_{31} \quad (14)$$

In the above Expression (14), $L_{11}$ represents a length of the boundary line 8 in its extending direction.

Thus, in the present embodiment, the above Expression (14) is established and, therefore, in the width direction of the lead wire layer 7, the width $W_{31}$ of the end part 76 of the lead wire layer 7 is relatively smaller than the length $L_{11}$ of the boundary line 8 in its extending direction. Accordingly, the lead wire layer 7 and the boundary line 8 are in contact with each other at the entire width area of the end part 76 of the lead wire layer 7. On the other hand, at least two first conductor lines 64 which constitute the mesh-like electrode layer 6 are in contact with the boundary line 8. This can avoid the necessity of providing an electrode terminal between the mesh-like electrode layer 6 and the lead wire layer 7 and the wiring body 4 can therefore be reduced in size. Moreover, the electric connection between the mesh-like electrode layer 6 and the lead wire layer 7 can be stable.

When the length $L_{11}$ of the boundary line 8 in its extending direction is longer than the width $W_{31}$ of the end part 76 of the lead wire layer 7 ($L_{11} > W_{31}$) as in the present embodiment, the electric resistance value can be low between the mesh-like electrode layer 6 and the lead wire layer 7 which are electrically connected via the boundary line 8. If, however, the length $L_{11}$ of the boundary line 8 is longer than the width $W_{51}$ of the mesh-like electrode layer 6, adjacent mesh-like electrode layers 6 may possibly be connected. Thus, the length $L_{11}$ of the boundary line 8 is preferably not longer than the width $W_{51}$ of the mesh-like electrode layer 6 ($L_{11} \leq W_{51}$).

In the relation between the mesh-like electrode layer 6 and the boundary line 8, a following Expression (15) is preferably established (see FIG. 2 and FIG. 3).

$$L_{11} \geq D_1 \quad (15)$$

Establishment of the above Expression (15) allows more reliable conduction between the mesh-like electrode layer 6 and the boundary line 8 and therefore between the mesh-like electrode layer 6 and the lead wire layer 7 via the boundary line 8. Moreover, when the above Expression (15) is established, the first conductor lines 64 of the mesh-like electrode layer 6 can be in contact with the boundary line 8 at least at two or more locations and the conduction pass can therefore be large enough to reduce the electric resistance value between the mesh-like electrode layer 6 and the boundary line 8.

In the present embodiment, from the viewpoint of further stabilizing the electric connection between the mesh-like electrode layer 6 and the lead wire layer 7, a following Expression (16) is preferably established (see FIG. 3, FIG. 6, and FIG. 8).

$$W_{21} \leq W_{41} \quad (16)$$

In the above Expression (16), $W_{41}$ represents a width of the boundary line 8.

As illustrated in FIG. 3, the wiring body 4 of the present embodiment includes electrode-side regions T1 that are located at the mesh-like electrode layer 6 side in the vicinity of the boundary line 8 and wiring-side regions T2 that are located at the lead wire layer 7 side in the vicinity of the boundary line 8. Each electrode-side region T1 is a minimum region among regions that are defined by the first conductor lines 64 which constitute the mesh-like electrode layer 6 and by the boundary line 8. The electrode-side region T1 has a shape different from that of the first unit meshes 65. On the other hand, each wiring-side region T2 is a minimum region among regions that are defined by the second conductor lines 74 which constitute the lead wire layer 7 and by the boundary line 8. The wiring-side region T2 has a shape different from that of the second unit meshes 75.

In the wiring body 4 of the present embodiment, the electrode-side regions T1 and the wiring-side regions T2 are not filled with a material having conductivity, and the flexibility of the wiring body 4 is thereby improved in the vicinity of the boundary line 8, thus suppressing the occurrence of breakage between the mesh-like electrode layer 6 and the boundary line 8 and between the lead wire layer 7 and the boundary line 8. The "electrode-side regions T1" in the present embodiment correspond to an example of the "first region" in the present invention and the "wiring-side regions T2" in the present embodiment correspond to an example of the "second region" in the present invention.

Figure 10:
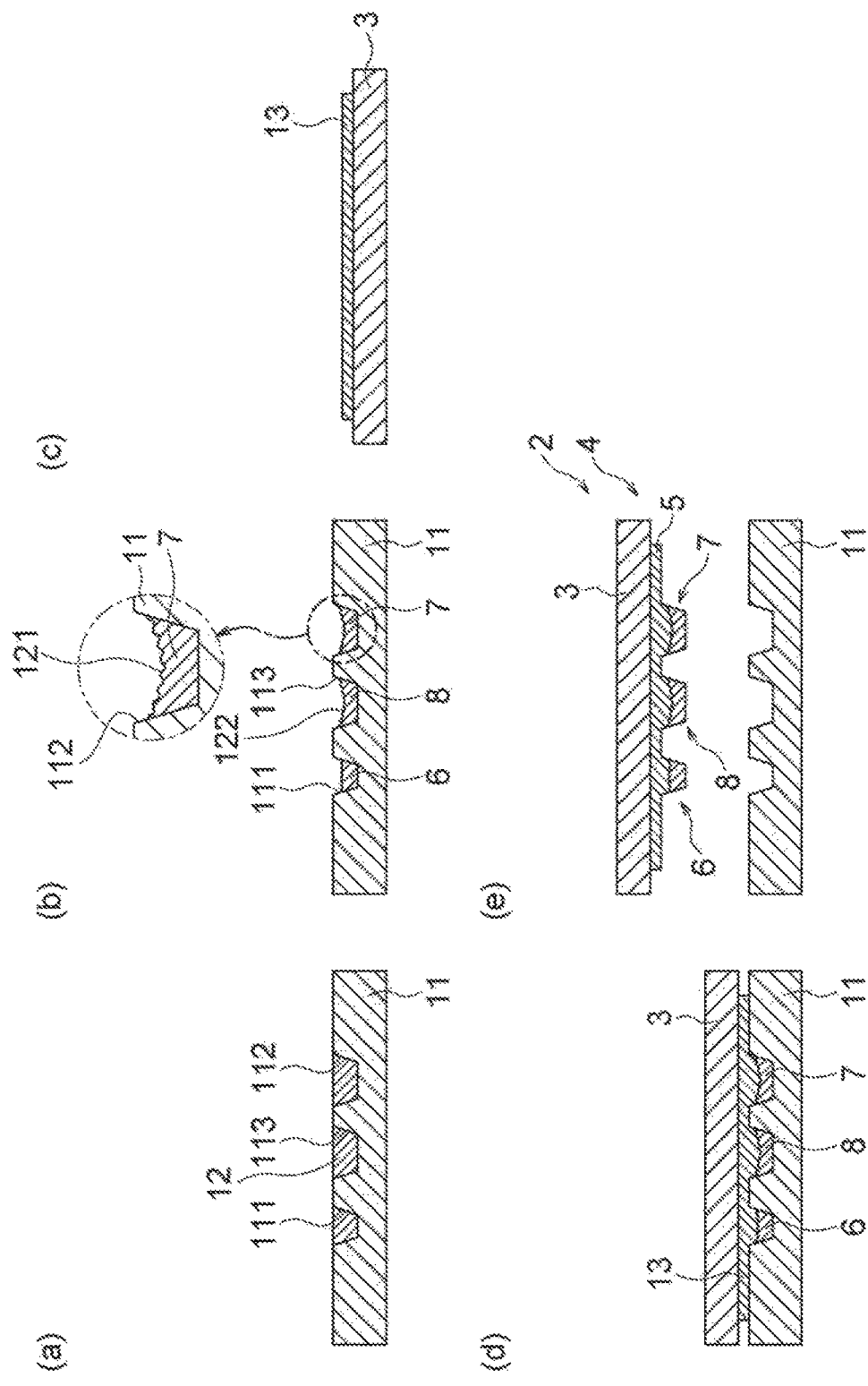
FIG. 10(a) to FIG. 10(e) are cross-sectional views illustrating a method of manufacturing a wiring board according to the first embodiment of the present invention.

A method of manufacturing a wiring board in the present embodiment will then be described. FIG. 10(*a*) to FIG. 10(*e*) are cross-sectional views illustrating a method of manufacturing a wiring board in the first embodiment of the present invention.

First, a recessed plate 11 is prepared as illustrated in FIG. 10(*a*). The recessed plate 11 is formed with a first recess 111 having a shape corresponding to the shape of each mesh-like electrode layer 6, a second recess 112 having a shape corresponding to the shape of each lead wire layer 7, and a third recess 113 having a shape corresponding to the shape of each boundary line 8.

Examples of a material that constitutes the recessed plate 11 include nickel, silicon, glasses such as silicon dioxide, ceramics, organic silicas, glassy carbon, thermoplastic resin, and photo-curable resin. The width of the first recess 111 is preferably 50 nm to 1,000 μm, more preferably 500 nm to 150 μm, further preferably 1 μm to 10 μm, and furthermore preferably 1 μm to 5 μm. The width of the second recess 112 and the third recess 113 is preferably 1 μm to 500 μm, more preferably 3 μm to 100 μm, and further preferably 5 μm to 20 μm. The depth of the first recess 111, the second recess 112, and the third recess 113 is preferably 100 nm to 300 μm and more preferably 1 μm to 50 μm. In the present embodiment, the cross-sectional shapes of the first to third recesses 111, 112, and 113 are each formed in a tapered shape that narrows toward the bottom part.

To improve releasability, it is preferred for the surfaces of the first to third recesses 111, 112, and 113 to be preliminarily formed with release layers (not illustrated) constituted of an appropriate material, such as a black lead-based material, silicone-based material, fluorine-based material, ceramic-based material, and aluminum-based material.

The first to third recesses 111, 112, and 113 of the above recessed plate 11 are filled with a conductive material 12. The above-described conductive paste may be used as such a conductive material 12.

Examples of a method of filling the first to third recesses 111, 112, and 113 of the recessed plate 11 with the conductive material 12 include a dispensing method, ink-jet method, and screen printing method. Another possible method may include coating with a conductive material, such as by a slit-coating method, bar-coating method, blade-coating method, dip-coating method, spray-coating method and spin-coating method, and then wiping, scratching, suctioning, peeling, washing, or blowing away the conductive material applied to other parts than the first to third recesses 111, 112, and 113. An appropriate method can be selected in accordance with the composition or the like of the conductive material and the shape or the like of the recessed plate.

Then, as illustrated in FIG. 10(*b*), the conductive material 12 which fills the first to third recesses 111, 112, and 113 of the recessed plate 11 is heated to form the mesh-like electrode layer 6, the lead wire layer 7, and the boundary line 8. A heating condition for the conductive material 12 can be appropriately set in accordance with the composition or the like of the conductive material. Due to this heating treatment, the conductive material 12 undergoes volume contraction to form curved shapes of the conductive material 12 on a surface 121 of the lead wire layer 7 and on a surface 122 of the boundary line 8. In addition, uneven shapes are slightly formed on the surfaces 121 and 122 of the conductive material 12. During this treatment, outer surfaces other than the upper surfaces of the conductive material 12 are formed into shapes that follow the first to third recesses 111, 112, and 113.

The treatment method for the conductive material 12 is not limited to heating. The conductive material 12 may be irradiated with energy rays, such as infrared rays, ultraviolet rays and laser light, or may also be simply dried. Two or more treatment methods as the above may be employed in combination. The existence of uneven shape and curved shape of the surface 121 increases the contact area between the lead wire layer 7 and the adhesion layer 5 and they can be more tightly fixed to each other. Similarly, the existence of uneven shape and curved shape of the surface 122 increases the contact area between the boundary line 8 and the adhesion layer 5 and they can be more tightly fixed to each other.

Subsequently, a base material 3 is prepared such that, as illustrated in FIG. 10(*c*), an adhesive material 13 for forming the adhesion layer 5 is approximately uniformly applied onto the base material 3. The above-described material which constitutes the adhesion layer 5 may be used as such an adhesive material 13. Examples of a method of applying the adhesive material 13 onto the base material 3 include a screen-printing method, spray-coating method, bar-coating method, dip method, and ink-jet method.

Then, as illustrated in FIG. 10(*d*), the base material 3 with the adhesive material 13 is disposed on the recessed plate 11 and pressed against the recessed plate 11 so that the adhesive material 13 gets into the first to third recesses 111, 112, and 113, and the adhesive material 13 is cured. Examples of a method of curing the adhesive material 13 include irradiation with energy rays, such as ultraviolet rays and infrared laser light, heating, heating and cooling, and drying. Through this operation, an adhesion layer 5 is formed and the adhesion layer 5 adheres between the base material 3 and the mesh-like electrode layer 6, the lead wire layer 7, and the boundary line 8 to fix them.

The method of forming the adhesion layer 5 is not particularly limited to the above. For example, the adhesion layer 5 may be formed through applying the adhesive material 13 onto the recessed plate 11 formed with the mesh-like electrode layers 6, the lead wire layers 7, and the boundary lines 8 (recessed plate 11 in the state illustrated in FIG. 10(*b*)), disposing the base material 3 on the adhesive material 13, and then curing the adhesive material 13 in a state in which the base material 3 is disposed above the recessed plate 11 and pressed against the recessed plate 11. When a thermoplastic material is used as the adhesive material 13, the adhesion layer 5 can be formed through melting the adhesive material 13, such as by heating, and then cooling it.

Subsequently, as illustrated in FIG. 10(*e*), the base material 3, the adhesion layer 5, the mesh-like electrode layers 6, the lead wire layers 7, and the boundary lines 8 are released from the recessed plate 11 and a wiring board 2 comprising the wiring body 4 can thus be obtained.

Although not particularly illustrated, after the above process is performed, a resin layer 9 is formed on the obtained wiring board 2 through applying a resin material onto the wiring board 2 so that the resin material covers the mesh-like electrode layers 6, the lead wire layers 7, and the boundary lines 8 and curing the resin material to form the resin layer 9. Then, mesh-like electrode layers 101 are formed so as to face the mesh-like electrode layers 6 via the formed resin layer 9. In addition, lead wire layers 102 are formed to be connected to the mesh-like electrode layers 101. A touch sensor 1 comprising the wiring body 4 can thus be obtained.

The same method as the method of forming the adhesion layer 5 can be exemplified as a method of forming the resin layer 9. The mesh-like electrode layers 101 and the lead wire layers 102 can be formed through the same method as the method of forming the mesh-like electrode layers 6 and the lead wire layers 7.

The method of forming the mesh-like electrode layers 101 and the lead wire layers 102 is not particularly limited to the above. For example, they may be formed through curing the resin layer 9 and then printing a conductive material on the resin layer 9, such as using screen printing, gravure offset printing, and ink jet printing. They may also be formed on the resin layer 9 through laminating a metal layer on the resin layer 9 and patterning the metal layer into mesh-like shapes. They may also be formed on the resin layer 9 using a sputtering method, vapor deposition method, chemical vapor deposition method (CVD method), electroless plating method, electrolytic plating method, or combination thereof.

The wiring body 4 and wiring board 2 in the present embodiment have the following effects.

In the present embodiment, the electrode layers and the lead wire layers are connected via the line-like boundary lines 8. When the electrode layers and the lead wire layers are connected, therefore, electrode terminals are not necessary. The wiring body can thus be reduced in size.

This will be more specifically described. In the wiring body 4 of the present embodiment, the above Expressions (7) and (14) are established. When Expression (14) is established, in the width direction of the lead wire layer 7, the width $W_{31}$ of the end part 76 of the lead wire layer 7 is relatively smaller than the length $L_{11}$ of the boundary line 8 in its extending direction. Accordingly, the lead wire layer 7 and the boundary line 8 are in contact with each other at the entire width area of the end part 76 of the lead wire layer 7. On the other hand, at least two first conductor lines 64 which constitute the mesh-like electrode layer 6 are in contact with the boundary line 8. This can avoid the necessity of providing electrode terminals between electrode layers and lead wire layers. Stability of electric connection between the mesh-like electrode layer 6 and the lead wire layer 7 is therefore ensured and the wiring body 4 can be reduced in size as the electrode terminals are omitted.

In the present embodiment, the above Expressions (8), (10), and (11) are established and it is thus possible to improve the visibility in the mesh-like electrode layer 6, improve the durability of the lead wire layer 7, and suppress the increase in the electric resistance value of the lead wire layer 7.

In the present embodiment, the above Expressions (12) and (13) are established and it is thus possible to improve the interfacial adhesion between the second conductor lines 74 of the lead wire layer 7 and the support parts 52 of the adhesion layer 5. This can suppress the occurrence of delamination between the lead wire layer 7 and the adhesion layer 5. Also with regard to the boundary line 8, the occurrence of delamination between the boundary line 8 and the adhesion layer 5 can be suppressed because the above Expressions (12) and (13) are established.

In the present embodiment, establishment of the above Expression (15) allows more reliable conduction between the mesh-like electrode layer 6 and the boundary line 8 and therefore between the mesh-like electrode layer 6 and the lead wire layer 7 via the boundary line 8. Moreover, when the above Expression (15) is established, the first conductor lines 64 of the mesh-like electrode layer 6 can be in contact with the boundary line 8 at least at two or more locations and the conduction pass can therefore be large enough to reduce the electric resistance value between the mesh-like electrode layer 6 and the boundary line 8.

In the wiring body 4 of the present embodiment, attention is also focused on the relative relationship of the surface roughness (i.e. the roughness parameter obtained by shutting off the waviness components) between the contact surface 61 of the first conductor line 64 and other surfaces than the contact surface 61 (surfaces including the top surface 62 and side surfaces 63), and the surface roughness Ra of the contact surface 61 is relatively rougher than the surface roughness of the other surfaces. This can suppress the diffuse reflection of incident light from external while allowing the adhesion layer 5 and the mesh-like electrode layer 6 to tightly adhere to each other. In particular, when the width of the first conductor line 64 is 1 μm to 5 μm, a remarkable effect can be obtained that the relative relationship of the surface roughness between the contact surface 61 and the other surfaces can satisfy the above-described relationship thereby to suppress the diffuse reflection of incident light from external while allowing the adhesion layer 5 and the mesh-like electrode layer 6 to tightly adhere to each other.

In the present embodiment, the side surface 63 extends so as to substantially coincide with the virtual line passing through the end parts 631 and 632. In this case, the side surface is in a shape in which a part of the side surface does not exist inside the virtual line passing through both ends of the side surface in the cross section of the first conductor line 64 in its width direction. The diffuse reflection of incident light from external of the wiring body 4 is therefore suppressed. This can further improve the visibility of the wiring body 4.

In the present embodiment, the surface roughness Ra of the contact surface 61 is relatively rougher than the surface roughness Ra of other surfaces than the contact surface 61 (surfaces including the top surface 62 and side surfaces 63) and, accordingly, the diffuse reflectance at the other surfaces is relatively smaller than the diffuse reflectance at the contact surface 61. Here, when the diffuse reflectance of the wiring body 4 is small, the first conductor line 64 can be avoided from being reflected to be white and the contrast degradation can be suppressed in a region in which the first conductor line 64 is visible. It is thus possible to further improve the visibility of the wiring body 4 of the present embodiment.

Figure 11:
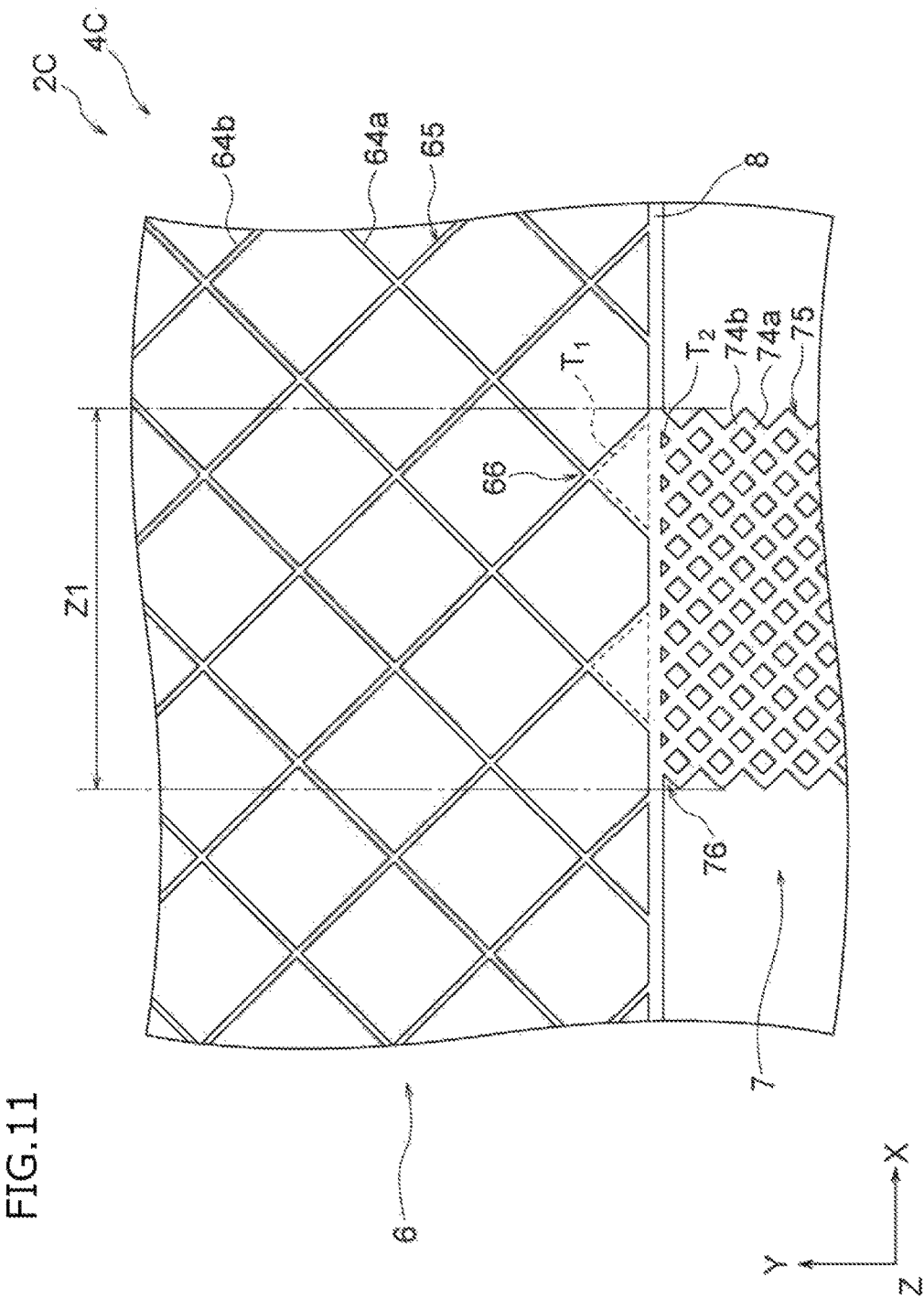
FIG. 11 is a plan view illustrating a second modified example of the wiring board according to the first embodiment of the present invention.
Figure 12:
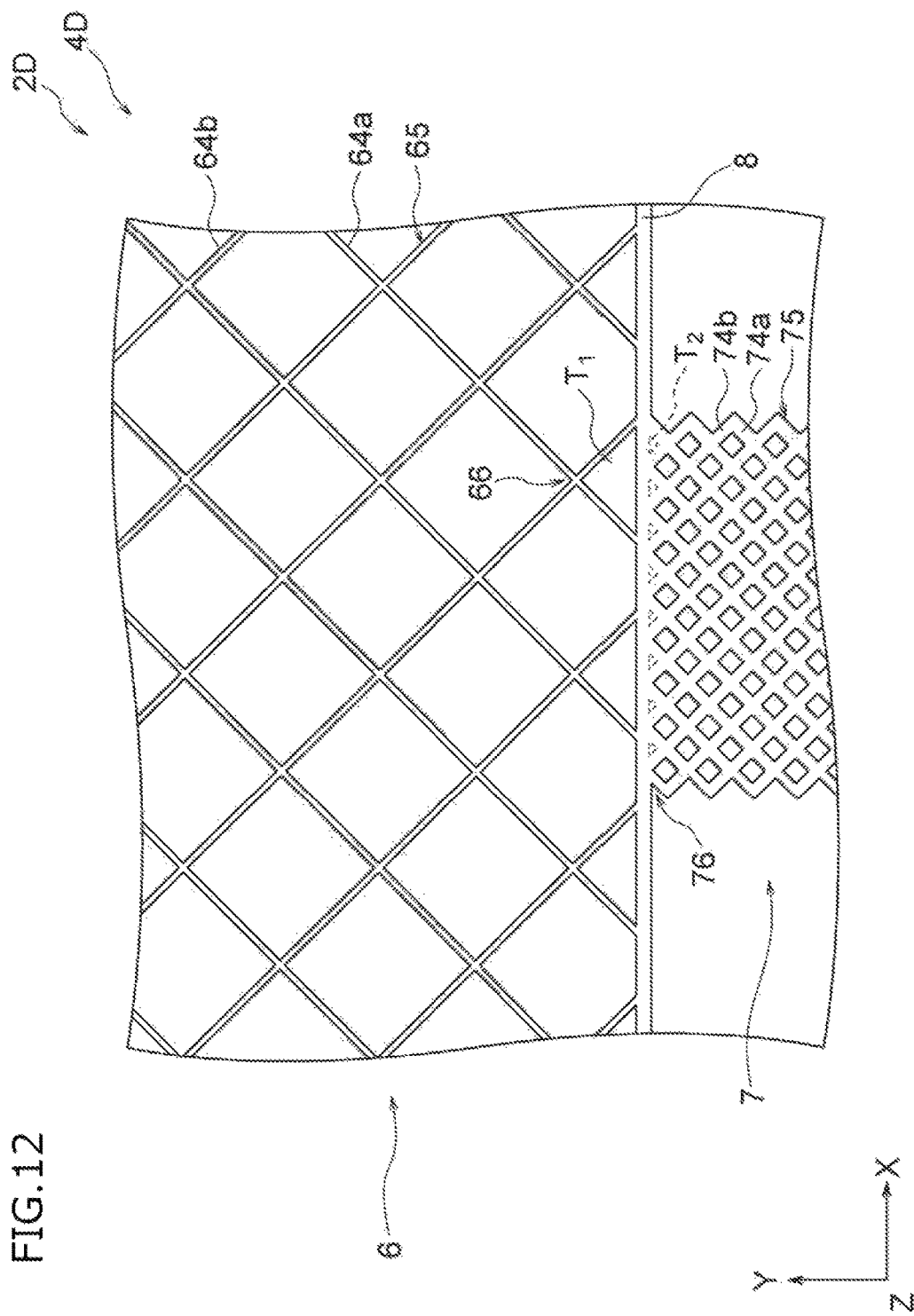
FIG. 12 is a plan view illustrating a third modified example of the wiring board according to the first embodiment of the present invention.
Figure 13:
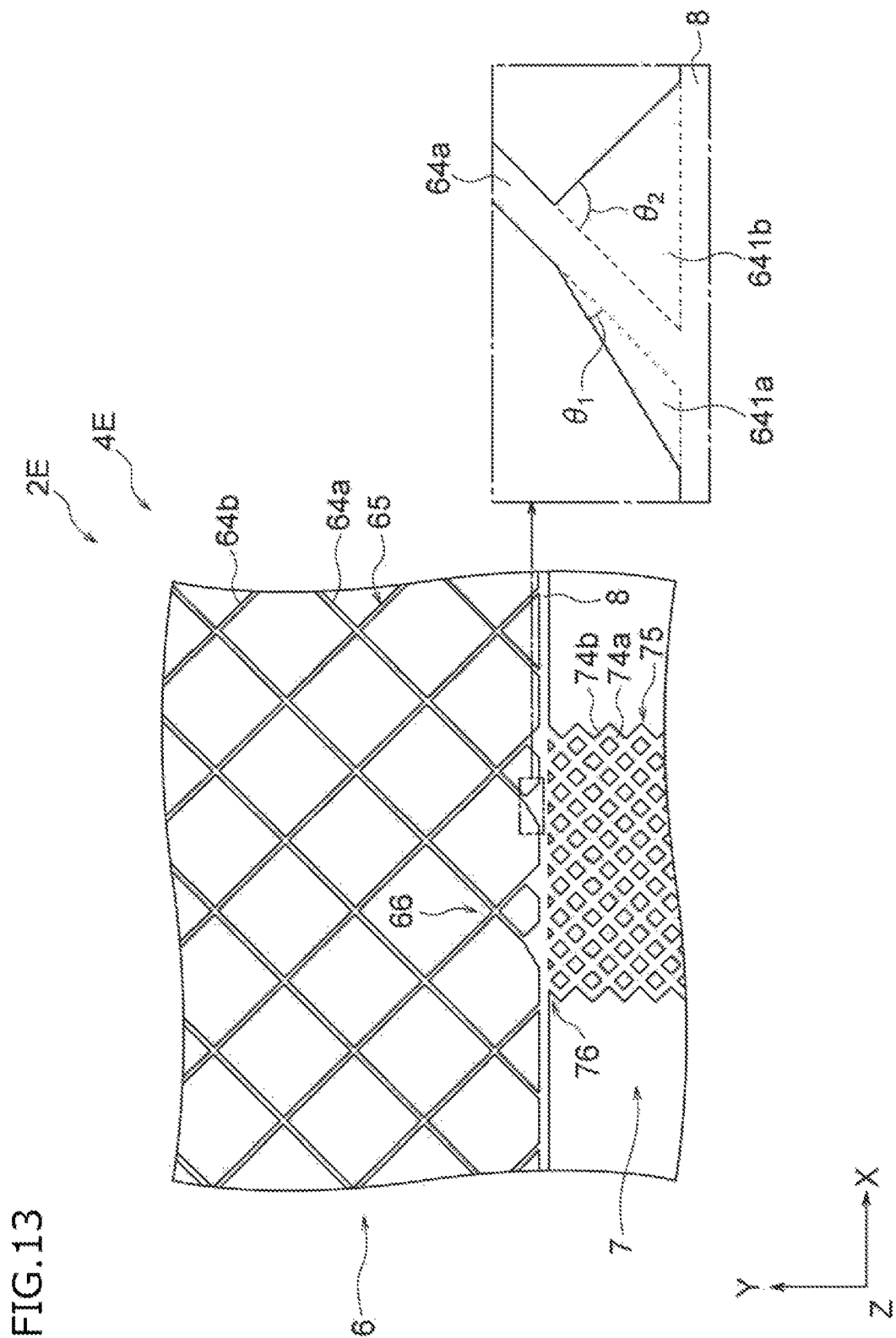
FIG. 13 is a plan view illustrating a fourth modified example of the wiring board according to the first embodiment of the present invention.
Figure 14:
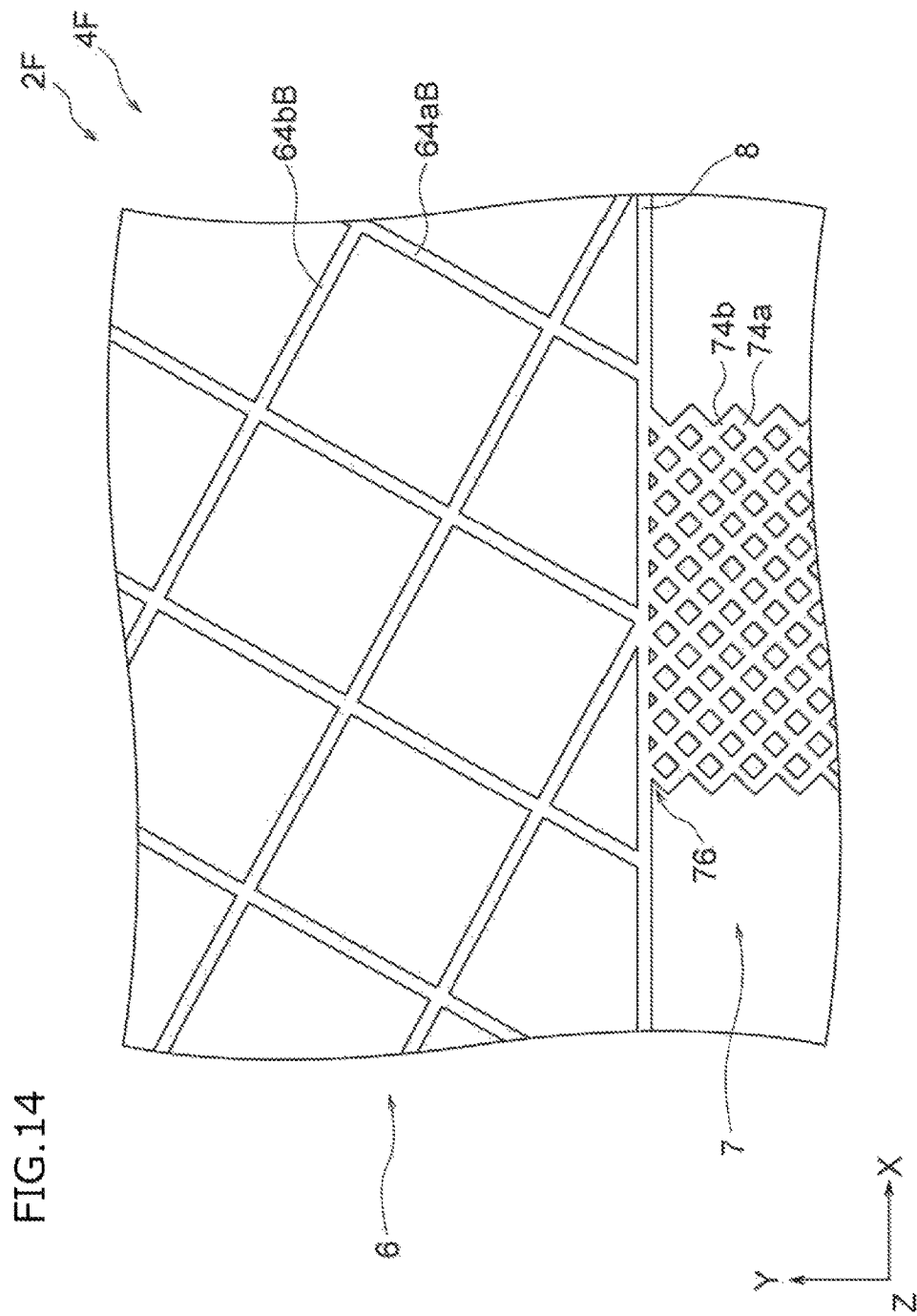
FIG. 14 is a plan view illustrating a fifth modified example of the wiring board according to the first embodiment of the present invention.

Modified examples of the wiring board 2 (wiring body 4) described in the first embodiment will be described below. FIG. 11 is a plan view illustrating a second modified example of the wiring board according to the first embodiment of the present invention, FIG. 12 is a plan view illustrating a third modified example of the wiring board according to the first embodiment of the present invention, FIG. 13 is a plan view illustrating a fourth modified example of the wiring board according to the first embodiment of the present invention, and FIG. 14 is a plan view illustrating a fifth modified example of the wiring board according to the first embodiment of the present invention.

For example, as illustrated in FIG. 11, the electrode-side regions T1 may be filled with a material having conductivity. In this case, the mechanical strength is improved between the mesh-like electrode layer 6 and the boundary line 8, and stability of electric connection is further enhanced in a wiring body 4C. In addition or alternatively, as illustrated in FIG. 12, the wiring-side regions T2 may be filled with a material having conductivity. In this case, the mechanical strength is improved between the lead wire layer 7 and the boundary line 8, and stability of electric connection is further enhanced in a wiring body 4D. Although not particularly illustrated, both the electrode-side regions T1 and the wiring-side regions T2 may be filled with a material having conductivity.

In the example illustrated in FIG. 11, the material having conductivity fills the electrode-side regions T1 which exist within a region Z1 that has a width corresponding to the width of the lead wire layer 7, extends in the extending direction of the mesh-like electrode layer 6, and has the same center axis as that of the mesh-like electrode layer 6. The arrangement is not particularly limited to this and the conductive material may fill all the electrode-side regions.

The same material as the above-described material which constitutes the mesh-like electrode layer 6, the lead wire layer 7, and the boundary line 8 can be used as the material which fills the electrode-side regions T1 and the wiring-side regions T2. In this case, it is preferred that all the materials which fill the mesh-like electrode layer 6, the lead wire layer 7, the boundary line 8, the electrode-side regions T1, and the wiring-side regions T2 have the same composition. The same method as the method of forming the mesh-like electrode layer 6, the lead wire layer 7, and the boundary line 8 may be used to fill the electrode-side regions T1 and the wiring-side regions T2 with the conductive material integrally with the mesh-like electrode layer 6, the lead wire layer 7, and the boundary line 8.

The configuration of the first conductor lines 64 is not particularly limited to the above and the configuration as illustrated in FIG. 13 may also be employed. That is, in this example, the first conductor lines 64a and 64b may have wide parts 641a and 641b in which the widths of the first conductor lines 64a and 64b increase gradually as approaching the boundary line 8 between a first intersection 66, among intersections of the first conductor lines 64a and 64b, which is closest to the boundary line 8 and the boundary line 8.

The wide parts 641a and 641b are provided at locations at which they are each in contact with the boundary line 8 at one end. Inclination angles $\theta_1$ and $\theta_2$ of such wide parts 641a and 641b are preferably 15° or more ($\theta_1 \geq 15°$, $\theta_2 \geq 15°$).

When the wide parts 641a and 641b are formed, the mechanical strength is improved between the mesh-like electrode layer 6 and the boundary line 8, and stability of electric connection is further enhanced in a wiring body 4E.

In this example, the first conductor lines 64a and 64b are formed with the wide parts 641a and 641b, respectively, but the arrangement is not particularly limited to this. For example, only the first conductor line 64a may be formed with the wide part 641a. In an alternative embodiment, only the first conductor line 64b may be formed with the wide part 641b. The "first intersection 66" in the present embodiment corresponds to an example of the "first contact" in the present invention.

In the present embodiment, the extending direction of the first conductor lines 64a which constitute the mesh-like electrode layer 6 and the extending direction of the second conductor lines 74a which constitute the lead wire layer are both substantially identical to the first direction, and the extending direction of the first conductor lines 64b which constitute the mesh-like electrode layer 6 and the extending direction of the second conductor lines 74b which constitute the lead wire layer are both substantially identical to the second direction, but the arrangement is not particularly limited to the above.

For example, as illustrated in FIG. 14, the extending direction of first conductor lines 64aB may be a direction that is not identical to any of extending directions of the second conductor lines 74a and 74b which constitute the lead wire layer 7. In addition or alternatively, the extending direction of first conductor lines 64bB may be a direction that is not identical to any of extending directions of the second conductor lines 74a and 74b which constitute the lead wire layer 7.

Thus, in this example, the first conductor lines 64aB are not parallel to the second conductor lines 74a and 74b and the first conductor lines 64bB are not parallel to the second conductor lines 74a and 74b. Due to this arrangement, in a wiring body 4F of this example, the direction in which the mesh-like electrode layer 6 is easily bent (flexed) when receiving external force applied to the wiring body 4F is different from the direction in which the lead wire layer 7 is easily bent (flexed). It is therefore possible to suppress the concentration of stress at the boundary between the mesh-like electrode layer 6 and the lead wire layer 7 and further improve the effect of suppressing the breakage between the mesh-like electrode layer 6 and the lead wire layer 7.

Second Embodiment

Figure 15:
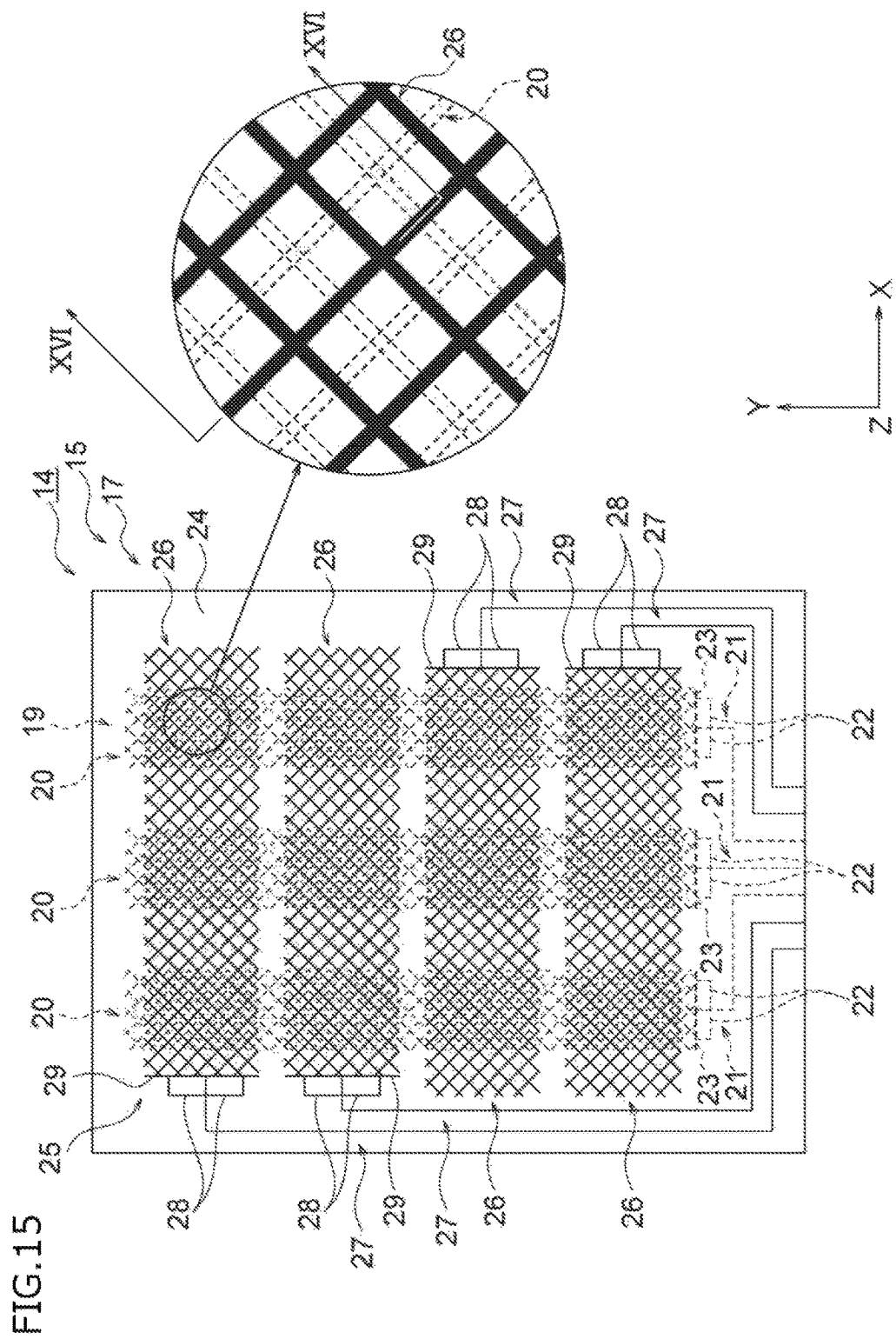
FIG. 15 is a plan view illustrating a touch sensor according to a second embodiment of the present invention.
Figure 16:
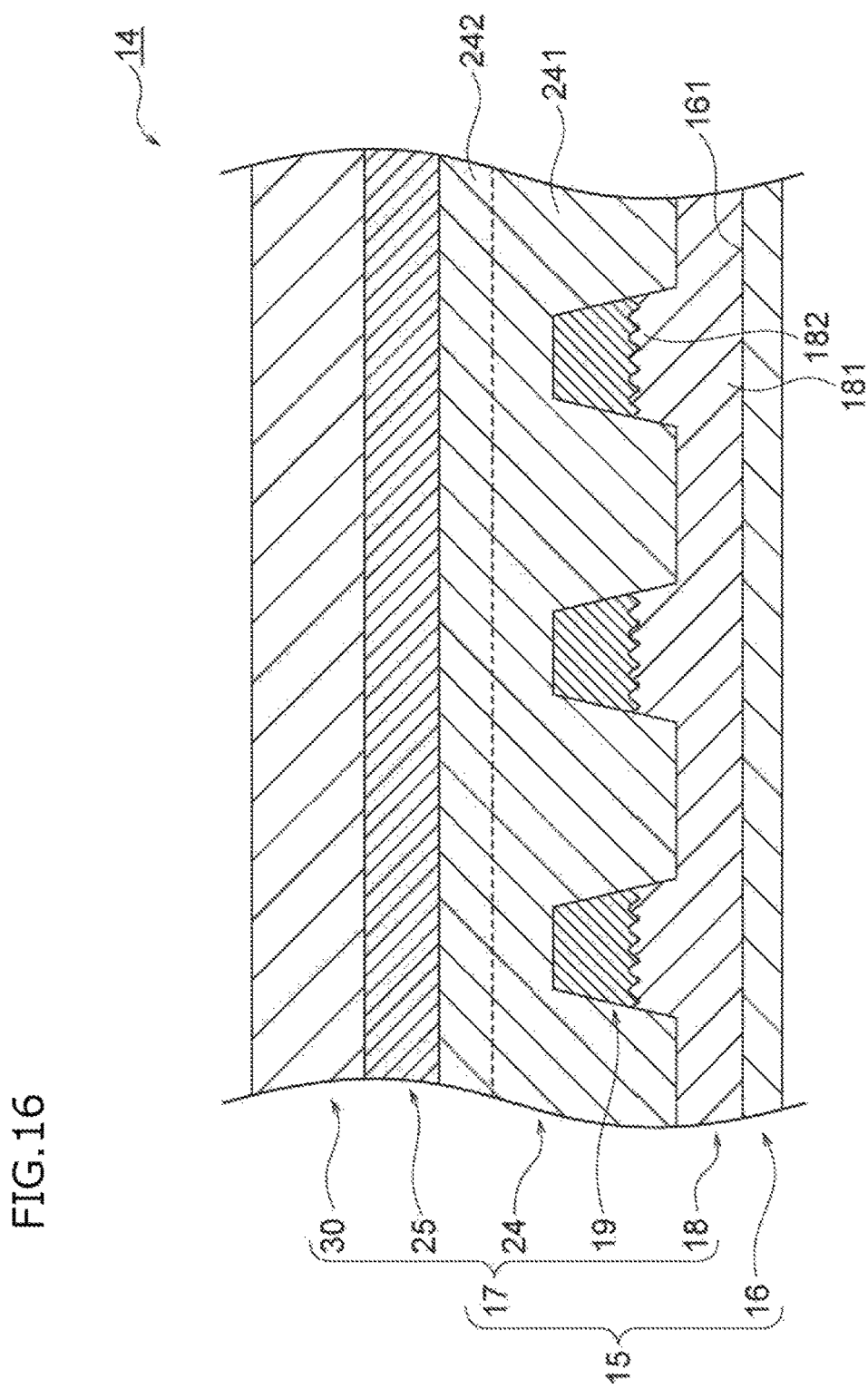
FIG. 16 is a cross-sectional view along line XVI-XVI of FIG. 15.
Figure 17:
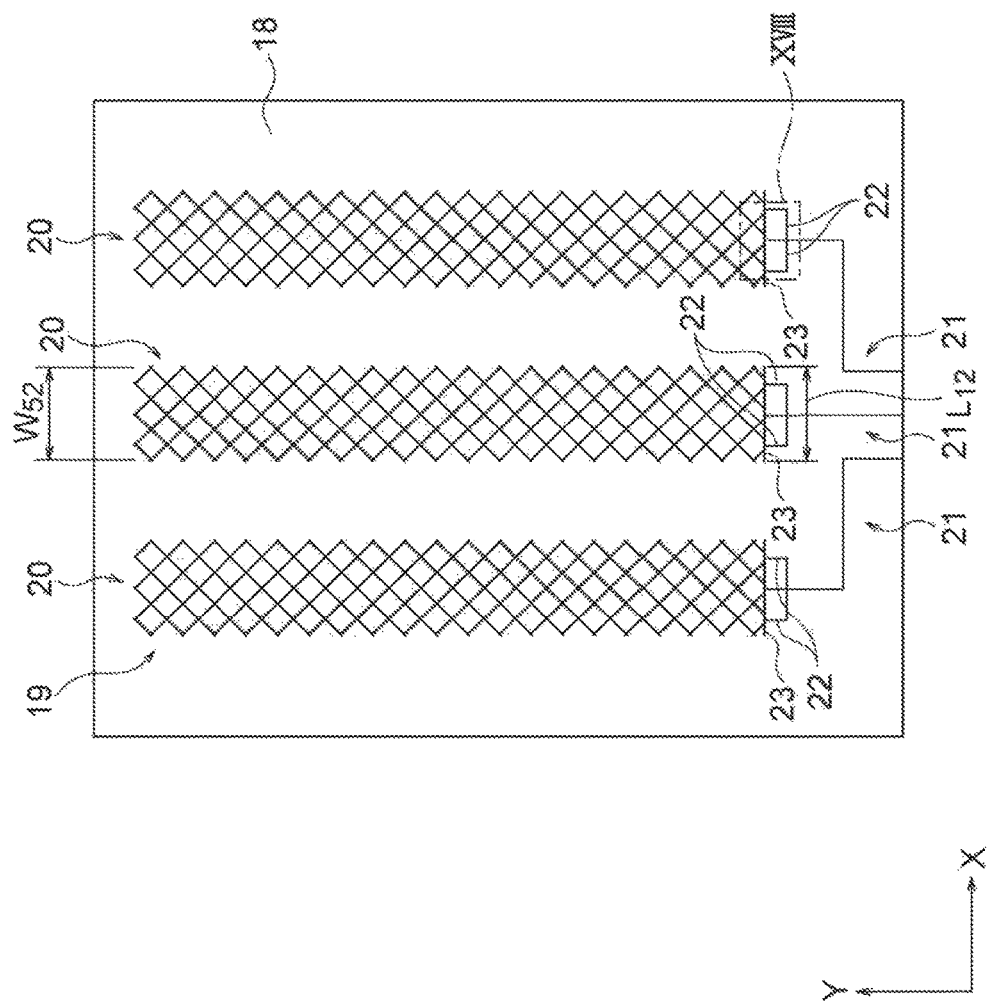
FIG. 17 is a plan view illustrating a wiring body according to the second embodiment of the present invention and is a view for describing a first conductor layer.
Figure 18:
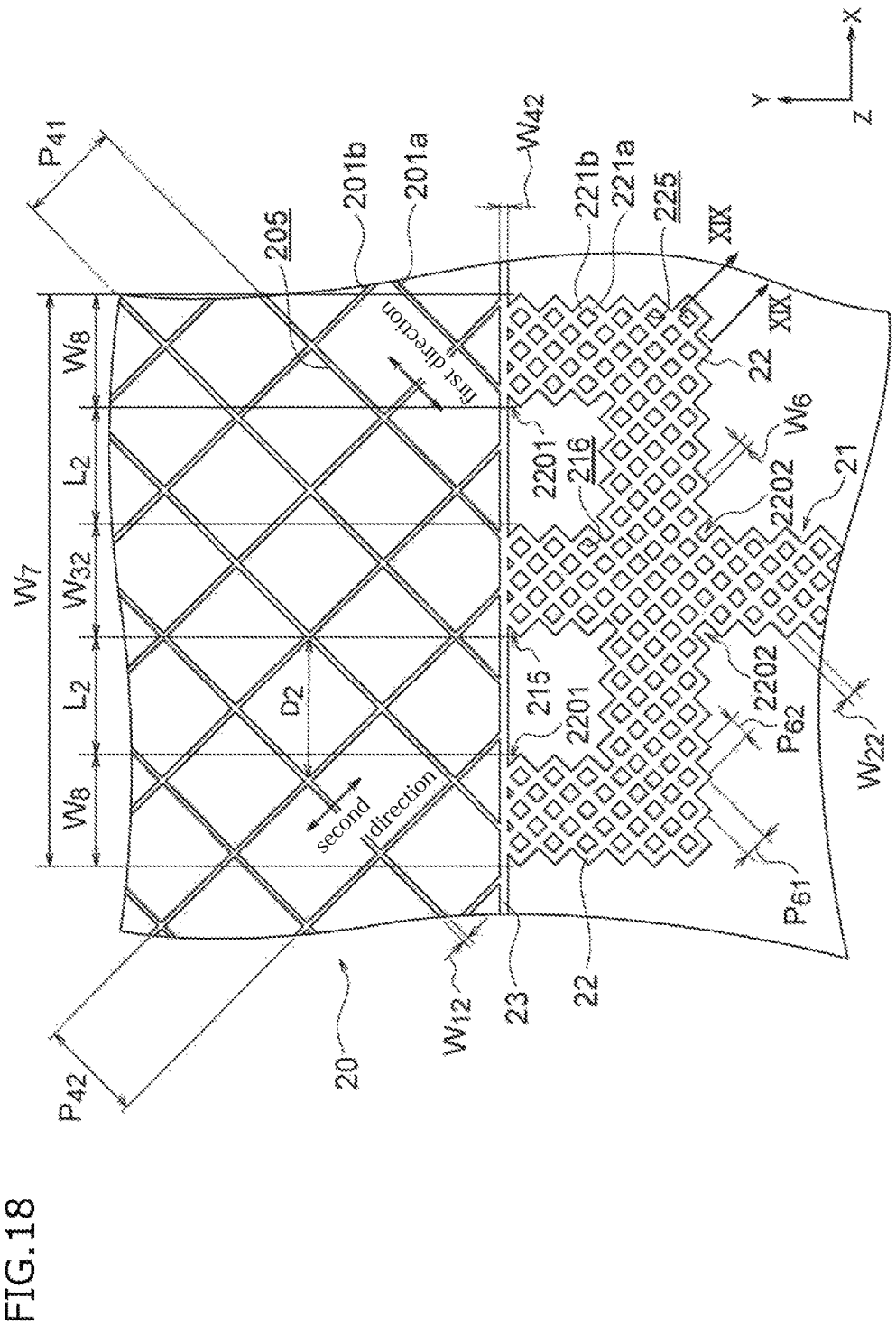
FIG. 18 is a partially-enlarged view of part XVIII of FIG. 17.
Figure 19:
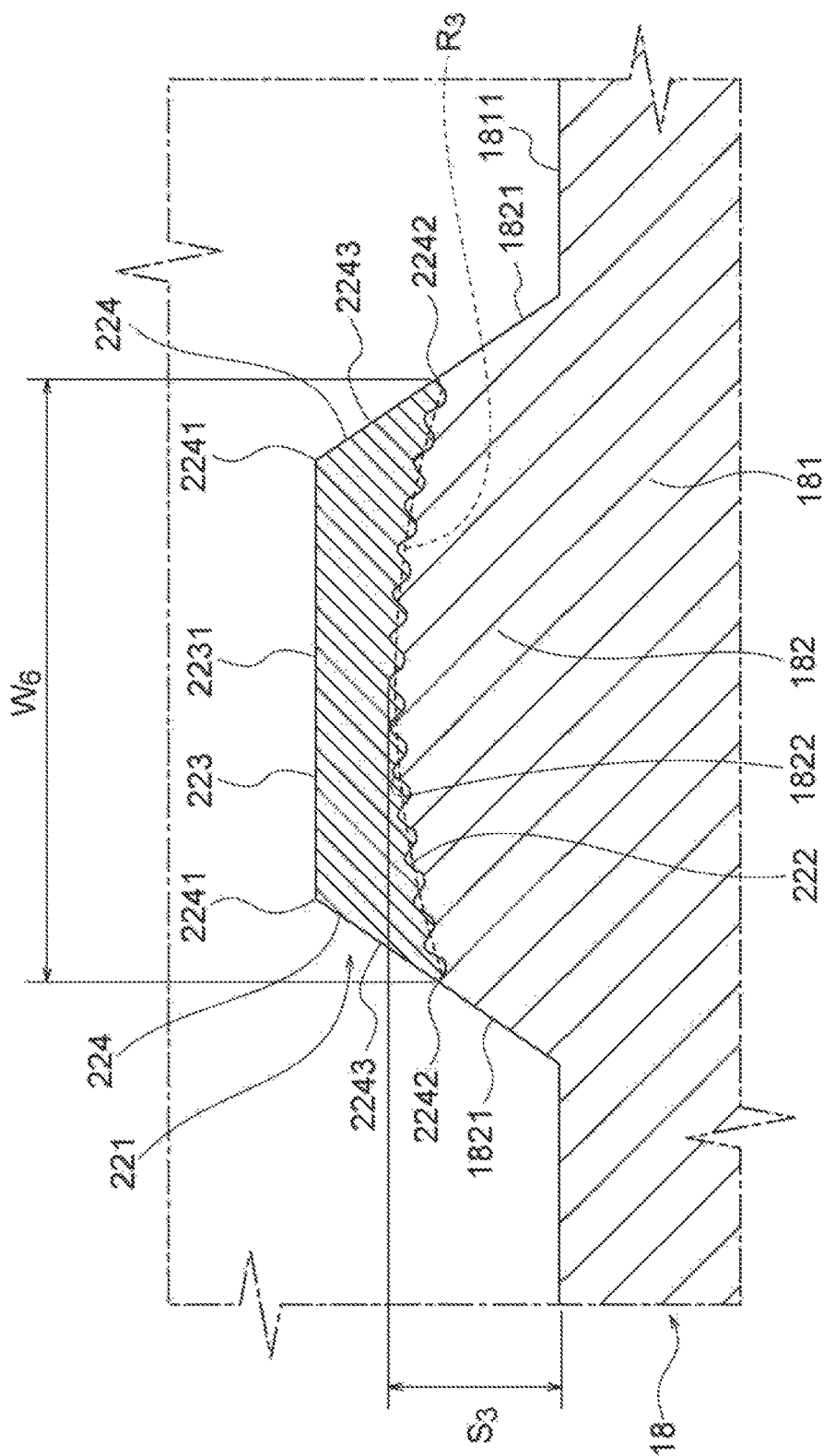
FIG. 19 is a cross-sectional view along line XIX-XIX of FIG. 18.

FIG. 15 is a plan view illustrating a touch sensor according to a second embodiment of the present invention, FIG. 16 is a cross-sectional view along line XVI-XVI of FIG. 15, FIG. 17 is a plan view illustrating a wiring body according to the second embodiment of the present invention and is a view for describing a first conductor layer, FIG. 18 is a partially-enlarged view of part XVIII of FIG. 17, and FIG. 19 is a cross-sectional view along line XIX-XIX of FIG. 18.

As illustrated in FIG. 15 and FIG. 16, the touch sensor 14 of the present embodiment is constituted by a wiring board 15. The wiring board 15 comprises a base material 16 and a wiring body 17. The "wiring board 15" in the present embodiment corresponds to an example of the "wiring board" in the present invention. For easy understanding of the structure of the wiring body 17, FIG. 15 omits a third resin layer 30 (described later) and illustrates a second conductor layer 25 (described later) by solid lines.

The base material 3 described in the first embodiment can be used as the base material 16. The "base material 16" in the present embodiment corresponds to an example of the "support body" in the present invention.

The wiring body 17 is formed on one main surface 161 of the base material 16 and supported by the base material 16. As illustrated in FIG. 16, the wiring body 17 comprises a first resin layer 18, a first conductor layer 19, a second resin layer 24, a second conductor layer 25, and a third resin layer 30. The "wiring body 17" in the present embodiment corresponds to an example of the "wiring body" in the present invention.

The first resin layer 18 of the present embodiment has the same basic configuration as that of the adhesion layer 5 described in the first embodiment. Accordingly, repetitive description will be omitted by replacing references to the adhesion layer 5, flat part 51, and support parts 52 with references to the first resin layer 18, flat part 181, and support parts 182, respectively, for reading and the description of the first embodiment will be borrowed herein.

The first conductor layer 19 is constituted of a conductive powder and a binder resin. The conductive powder as described in the first embodiment is used as the conductive powder. The binder resin as described in the first embodiment is used as the binder resin. Such a first conductor layer 19 is formed by applying a conductive paste and curing it. The conductive paste as described in the first embodiment is used as the conductive paste.

As illustrated in FIG. 17, the first conductor layer 19 includes first mesh-like electrode layers 20, first lead wire layers 21, second lead wire layers 22, and first boundary lines 23. The first mesh-like electrode layers 20 are detection electrodes of the touch sensor 14. The first and second lead wire layers 21 and 22 are provided for extracting detection signals from the first mesh-like electrode layers 20 to external. The first boundary lines 23 are provided for electrically connecting the first mesh-like electrode layers 20 to respective first lead wire layers 21. In the present embodiment, the first mesh-like electrode layers 20, the first lead wire layers 21, the second lead wire layers 22, and the first boundary lines 23 are formed integrally with respective corresponding ones. As used herein, the term "integrally with" refers to a situation in which a member and another member are not separated from each other and they are formed as a one-body structure using the same material (such as using conductive particles of the same particle diameter and the same binder resin). The "first mesh-like electrode layers 20" in the present embodiment correspond to an example of the "electrode layer" in the present invention, the "first lead wire layers 21" in the present embodiment correspond to an example of the "first lead wire layer" in the present invention, the "second lead wire layers 22" in the present embodiment correspond to an example of the "second lead wire layer" in the present invention, and the "first boundary lines 23" in the present embodiment correspond to an example of the "boundary line" in the present invention.

The first mesh-like electrode layers 20 of the present embodiment have the same basic configuration as that of the mesh-like electrode layers 6 described in the first embodiment. Accordingly, the description of the mesh-like electrode layers 6 in the first embodiment will be borrowed herein to omit the description of the first mesh-like electrode layers 20.

The first lead wire layers 21 are not required to have optical transparency because they are provided so as not to overlap the image information displayed on a display device, but are formed in a mesh-like shape in the present embodiment from the viewpoint of easy integral formation of the first lead wire layers 21 and respective first mesh-like electrode layers 20. The first lead wire layers 21 have the same basic configuration as that of the lead wire layers 7 described in the first embodiment. Accordingly, the description of the lead wire layers 7 in the first embodiment will be borrowed herein to omit the description of the first lead wire layers 21. Each first lead wire layer 21 has a plurality of second unit meshes 216, which have the same shape in the present embodiment, but the arrangement is not particularly limited to this, and unit meshes having different shapes may be mixed in accordance with the shape and arrangement of conductor lines. In the following description, only differences of the first lead wire layers 21 from the lead wire layers 7 described in the first embodiment will be described in detail.

As illustrated in FIG. 18, one end 2201 of each second lead wire layer 22 is connected to the first boundary line 23 while the other end 2202 is connected to the first lead wire layer 21. The second lead wire layer 22 is formed of third conductor lines 221 into a mesh-like shape. Each first lead wire layer 21 of the present embodiment is led out from a position that is substantially identical to the center in the X-direction of the corresponding first mesh-like electrode layer 20 (see FIG. 17) while each second lead wire layer 22 is led out from a position separated from the first lead wire layer 21. The first and second lead wire layers 21 and 22 are therefore separated from each other, and a region that is not formed with second and third conductor lines 211 and 221 is provided between the first and second lead wire layers 21 and 22.

In the present embodiment, two second lead wire layers 22 are provided for one first mesh-like electrode layer 20 and one first lead wire layer 21. As illustrated in FIG. 18, the first lead wire layer 21 is disposed in a linear shape while the second lead wire layers 22 are arranged so as to be curved, and end parts 2202 of the second lead wire layers 22 are electrically connected to the first lead wire layer 21. The distance $L_2$ between adjacent first and second lead wire layers 21 and 22 is not particularly limited and may be the same, or different distances may otherwise be mixed.

The distance $L_2$ between adjacent first and second lead wire layers 21 and 22 is preferably set to satisfy a following Expression (16) and more preferably set to satisfy a following Expression (17) in relation to a maximum value $D_2$ of the width of first unit meshes 205 of the first mesh-like electrode layer 20.

$$D_2 \leq L_2 \quad (16)$$

$$D_2 \leq L_2 \quad (17)$$

In the above Expressions (16) and (17), $D_2$ represents a maximum value of the width of the first unit meshes 205 in the extending direction of the first boundary line 23 and $L_2$ represents a distance between adjacent first and second lead wire layers 21 and 22 in the extending direction of the first boundary line 23.

In FIG. 18, for easy-to-understand description of the first mesh-like electrode layer 20 and the first and second lead wire layers 21 and 22, the distance between the adjacent first and second lead wire layers 21 and 22 is illustrated as being smaller than the maximum value of the width of the first unit meshes 205, but, in practice, the distance between the adjacent first and second lead wire layers 21 and 22 is larger than the maximum value of the width of the first unit meshes 205, as illustrated in FIG. 17 (i.e., the above Expression (17) is established).

Although not particularly illustrated, each second lead wire layer 22 may be divided into a plurality of layers from the end part 2202 to the first boundary line 23. In this case, a plurality of end parts 2202 of the second lead wire layer 22 exists. The distance between adjacent divided second lead wire layers 22 and 22 is not particularly limited and may be the same distance, or different distances may otherwise be mixed. The distance between adjacent divided second lead wire layers 22 and 22 may be or may not be the same as the distance $L_2$ between adjacent first and second lead wire layers 21 and 22.

In the present embodiment, widths $W_8$ of the second lead wire layers 22 are not particularly limited and may be substantially the same width or may also be different widths. For example, from the viewpoint of suppressing the difference in electric resistance values between the second lead wire layers 22, the $W_8$ of each second lead wire layer 22 may be set in accordance with the entire length of the second lead wire layer 22. For example, the width of a second lead wire layer 22 having a longer entire length may be set larger than the width of the other second lead wire layer 22 having a shorter entire length.

Here, the first lead wire layer 21 is electrically connected to all of the corresponding second lead wire layers 22. The first lead wire layer 21 is led out from the first boundary line 23 and extends such that one end part thereof is located in the vicinity of the outer edge of the wiring body 17 (see FIG. 17). Arrangement of portions at which the first and second lead wire layers 21 and 22 are connected to each other (i.e. end parts 2202 of the second lead wire layers 22) is not particularly limited, provided that these portions are located within an area before the first mesh-like electrode layer 20 is connected to an external circuit.

In the present embodiment, the relationship between the width $W_8$ of the second lead wire layers 22 and the width $W_{32}$ of end part 215 of the first lead wire layer 21 is not particularly limited. For example, the width $W_8$ of the second lead wire layers 22 and the width $W_{32}$ of end part 215 of the first lead wire layer 21 may be substantially the same or these widths may also be different. In other words, the width $W_{32}$ of end part 215 of the first lead wire layer 21 may be larger than any of widths $W_8$ of the second lead wire layers 22, or the width $W_{32}$ of end part 215 of the first lead wire layer 21 may be smaller than any of widths $W_8$ of the second lead wire layers 22. When the width $W_{32}$ of end part 215 of the first lead wire layer 21 is set larger than any of widths $W_8$ of the second lead wire layers 22, the width $W_{32}$ of end part 215 of the first lead wire layer 21 may be set as a width that is comparable with the total value obtained by summing up the widths $W_8$ of the second lead wire layers 22 from the viewpoint of suppressing the difference in electric resistance values between the first and second lead wire layers 21 and 22.

As illustrated in FIG. 18, each second lead wire layer 22 is formed to have a mesh-like shape in which a plurality of third conductor lines 221*a* having conductivity and a plurality of third conductor lines 221*b* having conductivity intersect with one another. In the present description, the "third conductor lines 221*a*" and the "third conductor lines 221*b*" may be collectively referred to as "third conductor lines 221," as necessary. The "third conductor lines 221" in the present embodiment correspond to an example of the "third conductor lines" in the present invention.

In the touch sensor 14, the second lead wire layers 22 are not required to have optical transparency because they are provided so as not to overlap the image information displayed on a display device, but are formed in a mesh-like shape in the present embodiment from the viewpoint of easy integral formation of the first mesh-like electrode layer 20 and the second lead wire layers 22.

As illustrated in FIG. 19, the third conductor lines 221 of the present embodiment have the same basic configuration as that of the second conductor lines 74 described in the first embodiment. Accordingly, repetitive description will be omitted by replacing references to the second conductor lines 74, contact surface 71, top surface 72, top surface flat part 721, side surfaces 73, end parts 731 and 732, side surface flat part 733, and second unit meshes 75 with references to the third conductor lines 221, contact surface 222, top surface 223, top surface flat part 2231, side surfaces 224, end parts 2241 and 2242, side surface flat part 2243, and third unit meshes 225, respectively, for reading and the description of the first embodiment will be borrowed herein. In the following description, only differences of the third conductor lines 221 from the second conductor lines 74 described in the first embodiment will be described in detail.

In the present embodiment, from the viewpoint of reducing the electric resistance value of the second lead wire layers 22, the width $W_6$ of the third conductor lines 221 is set to satisfy a following Expression (18) in relation to the width $W_{12}$ of first conductor lines 201 (see FIG. 18).

$$W_{12} < W_6 \quad (18)$$

In the above Expression (18), $W_{12}$ represents a width of the first conductor lines 201 in a direction orthogonal to the extending direction of the first conductor lines 201 and $W_6$ represents a width of the third conductor lines 221 in a direction orthogonal to the extending direction of the third conductor lines 221. The "width" as used herein refers to an average maximum width of conductor lines in a direction orthogonal to the extending direction of the conductor lines.

In the present embodiment, a surface obtained by averaging the uneven shape of the contact surface 222 of the third conductor line 221 is moderately curved toward the direction of departing from the base material 16 as compared with a surface obtained by averaging the uneven shape of the contact surface of the first conductor line 201, and the relationship between the first and third conductor lines 201 and 221 is preferably set to satisfy following Expressions (19) and (20);

$$S_1 < S_3 \quad (19)$$

$$R_1 < R_3 \quad (20)$$

In the above Expression (19), $S_1$ represents a thickness (average maximum thickness in the cross-sectional view across the entire plane) of the first resin layer 18 at an adhesion portion (adhesion surface) with the contact surface of the first conductor line 201 and $S_3$ represents a thickness (average maximum thickness in the cross-sectional view across the entire plane) of the first resin layer 18 at an adhesion portion (adhesion surface) with the contact surface 222 of the third conductor line 221. In the above Expression (20), $R_1$ represents a curvature of a surface obtained by averaging the contact surface of the first conductor line 201 and $R_3$ represents a curvature of a surface obtained by averaging the contact surface 222 of the third conductor line 221.

As used herein, the "average maximum thickness in the cross-sectional view across the entire plane" refers to a value obtained through sampling a plurality of cross-sections along the width direction of each conductor line across the entire extending direction of the conductor line and averaging maximum thicknesses obtained for respective cross-sections.

In the second lead wire layers 22 of the present embodiment, the above-described third conductor lines 221 are arranged as below. As illustrated in FIG. 18, each third conductor lines 221a extends linearly along the first direction, and the plurality of the third conductor lines 221a is arranged at a regular pitch $P_{61}$ in the second direction.

On the other hand, each third conductor line 221b extends linearly along the second direction, and the plurality of the third conductor lines 221b is arranged at a regular pitch $P_{62}$ in the first direction. The third conductor lines 221a and 221b are orthogonal to one another and the quadrangle-shaped (rhombus-shaped) third unit meshes 225 are thus arranged to repeat. Each third unit mesh 225 is defined by a pair of third conductor lines 221a and a pair of third conductor lines 221b.

Thus, in the present embodiment, the third conductor lines 221 are arranged to incline with respect to the extending direction of each second lead wire layer 22 and the side end part of the second lead wire layer 22 is closed by the plurality of third conductor lines 221. The side end part of the second lead wire layer 22 therefore extends in the extending direction of the second lead wire layer 22 in a zigzag shape by the plurality of third conductor lines 221.

As illustrated in FIG. 18, the second conductor lines 211 which constitute the first lead wire layer 21 are also arranged to incline with respect to the extending direction of the first lead wire layer 21 and the side end part of the first lead wire layer 21 is closed by the plurality of second conductor lines 211. The side end part of the first lead wire layer 21 therefore extends in the extending direction of the first lead wire layer 21 in a zigzag shape by the plurality of second conductor lines 211.

The structure of the second lead wire layer 22 is not particularly limited to the above. For example, the pitch $P_{61}$ of the third conductor lines 221a is substantially the same as the pitch $P_{62}$ of the third conductor lines 221b in the present embodiment ($P_{61} = P_{62}$), but the present invention is not particularly limited to this, and the pitch $P_{61}$ of the third conductor lines 221a may be different from the pitch $P_{62}$ of the third conductor lines 221b ($P_{61} \neq P_{62}$).

In this case, the relationship between the pitch (pitch $P_{41}$, $P_{42}$) of adjacent first conductor lines 201 in the first mesh-like electrode layer 20 and the corresponding pitch (which collectively represents pitches $P_{21}$ and $P_{22}$) of adjacent third conductor lines 221 in the second lead wire layers 22 preferably satisfies following Expressions (21) and (22);

$$P_{41} > P_{61} \quad (21)$$

$$P_{42} > P_{62} \quad (22)$$

Here, the relationship between the pitches is based on the extending directions of the first and second conductor lines 201 and 221. Specifically, the pitch $P_{41}$ of adjacent first conductor lines 201a corresponds to the pitch $P_{61}$ of adjacent third conductor lines 221a and the pitch $P_{42}$ of adjacent first conductor lines 201b corresponds to the pitch $P_{62}$ of adjacent third conductor lines 221b.

As a result, with consideration for the above Expressions (18), (21), and (22) in the present embodiment, the relationship between the aperture ratio $A_3$ of the first mesh-like electrode layer 20 and the aperture ratio $A_4$ of the second lead wire layers 22 preferably satisfies a following Expression (23);

$$A_3 > A_4 \quad (8)$$

Specifically, from the viewpoint of improving the optical transparency in the first mesh-like electrode layer 20, the aperture ratio $A_3$ of the first mesh-like electrode layer 20 is preferably 85% or more and less than 100% and more preferably 90% or more and less than 100%. On the other hand, from the viewpoint of reducing the difference in rigidity between the first mesh-like electrode layer 20 and the second lead wire layers 22 and improving the durability of the second lead wire layers 22, the aperture ratio $A_4$ of the second lead wire layers 22 is preferably 50% or less and more preferably 10% or more.

The extending directions of the third conductor lines 221 of the present embodiment are not particularly limited to the above, as in the first conductor lines 201, and any extending direction can be employed. In the present embodiment, the third conductor lines 221 are in a linear shape, but the present invention is not particularly limited to this, and they may be in a specific shape, such as a curved shape, horseshoe-like shape and zigzag shape.

In the second lead wire layers 22, any of various figure units can be used as the shape of the third unit meshes 225 as in the case of the first mesh-like electrode layer 20. In the present embodiment, the third unit meshes 225 have the same shape, but the present invention is not particularly limited to this, and unit meshes of different shapes may be mixed in accordance with the shape and arrangement of conductor lines.

The first boundary line 23 of the present embodiment has the same basic configuration as that of the boundary line 8 described in the first embodiment. Accordingly, the description of the boundary line 8 in the first embodiment will be borrowed herein to omit the description of the first boundary line 23. In the following description, only differences of the first boundary line 23 from the boundary line 8 described in the first embodiment will be described in detail.

The first boundary line 23 is set such that, as illustrated in FIG. 18, the relationship between the width $W_{12}$ of the first conductor lines 201 which constitute the first mesh-like electrode layer 20 and the width $W_{42}$ of the first boundary line 23 satisfies a following Expression (24);

$$W_{12} < W_{42} \quad (24)$$

In the above Expression (24), $W_{42}$ represents a width of the first boundary line 23 in a direction orthogonal to the extending direction of the first boundary line 23.

As illustrated in FIG. 17 and FIG. 18, the first boundary line 23 extends along the X-direction. In the present embodiment, the first boundary line 23 has a length $L_{12}$ that is substantially identical to the width $W_{52}$ of the first mesh-like electrode layer 20. As a result, the first boundary line 23 is in electric contact with at least two or more first conductor lines 201 which constitute the first mesh-like electrode layer 20. The length $L_{12}$ of the first boundary line 23 is not particularly limited to the above, but if the length $L_{12}$ of the first boundary line 23 is longer than the width $W_{52}$ of the first mesh-like electrode layer 20, adjacent first boundary lines 23 may possibly be in contact with each other thereby to deteriorate the quality of the touch sensor 14. In this regard, the length $L_{12}$ of the first boundary line 23 is preferably not more than the width $W_{52}$ of the first mesh-like electrode layer 20 ($W_{52} \geq L_{12}$).

On the other hand, the first boundary line 23 is also in electric contact with both the first and second lead wire layers 21 and 22. In this case, the length $L_{12}$ of the first boundary line 23 is preferably longer than a distance $W_7$ between outer end parts of lead wire layers, among the first and second lead wire layers 21 and 22, which are disposed at locations that are most separated from each other (in the present embodiment, the distance $W_7$ is a distance between outer end parts of the second lead wire layers 22 and 22 which are disposed at locations that are most separated from each other) ($W_7 \leq L_{12}$).

As illustrated in FIG. 16, the second resin layer 24 is formed on the first resin layer 18 so as to cover the first conductor layer 19. The second conductor layer 25 is formed on the second resin layer 24. As a result, the second resin layer 24 is interposed between the first conductor layer 19 and the second conductor layer 25 and has a function of ensuring the insulation therebetween. In the touch sensor 14, the second resin layer 24, which is interposed between the detection electrodes and the drive electrodes (i.e. the first and second mesh-like electrode layers 20 and 26), acts as a dielectric substance and the sensitivity of the touch sensor 14 is adjusted in accordance with the thickness of the second resin layer 24.

The second resin layer 24 is constituted of a main part 241 that covers the first conductor layer 19 and support parts 242 that are formed on the main part 241. The support parts 242 are formed between the main part 241 and the second conductor layer 25 so as to protrude toward the direction of departing from the first resin layer 18 (upward direction in FIG. 17). The same material as the material which constitutes the first resin layer 18 can be exemplified as the material which constitutes the second resin layer 24.

As illustrated in FIG. 15 and FIG. 16, the second conductor layer 25 includes second mesh-like electrode layers 26, third lead wire layers 27, fourth lead wire layers 28, and second boundary lines 29. The second mesh-like electrode layers 26 are drive electrodes of the touch sensor 14. The third and fourth lead wire layers 27 and 28 are provided to transmit drive signals (to apply a predetermined voltage) for detecting a touch position to the second mesh-like electrode layers 26. The second boundary lines 29 are provided for electrically connecting the second mesh-like electrode layers 26 to the third and fourth lead wire layers 27 and 28 which correspond to the second mesh-like electrode layers 26.

The second conductor layer 25 of the present embodiment has the same basic configuration as that of the above-described first conductor layer 19. In the following description, therefore, only differences in the configuration of the second conductor layer 25 from the first conductor layer 19 will be described in detail, and detailed description of the other basic structure will be omitted because the other basic structure is the same as that of the first conductor layer 19.

As illustrated in FIG. 15, the second conductor layer 25 of the present embodiment includes four rectangular second mesh-like electrode layers 26 that elongate along the X-direction approximately parallel to one another. The second mesh-like electrode layers 26 are arranged so as to face the first mesh-like electrode layers 20 via the second resin layer 24 in the plan view.

As illustrated in FIG. 15, the third lead wire layers 27 are provided to correspond to the second mesh-like electrode layers 26. In the present embodiment, four third lead wire layers 27 are formed to correspond to the four second mesh-like electrode layers 26.

In the present embodiment, the third lead wire layers 27 corresponding to two second mesh-like electrode layers 26 located at the +Y-direction side are each led out via the second boundary line 29 from approximately the center of the short side at the −X-direction side of the corresponding second mesh-like electrode layer 26. On the other hand, the third lead wire layers 27 corresponding to the remaining second mesh-like electrode layers 26 (i.e. two second mesh-like electrode layers 26 located at the −Y-direction side) are each led out via the second boundary line 29 from approximately the center of the short side at the +X-direction side of the corresponding second mesh-like electrode layer 26. In the plan view, the third lead wire layers 27 extend to the vicinities of the first lead wire layers 21 while avoiding overlapping the region in which the first and second mesh-like electrode layers 20 and 26 are formed.

In the present embodiment, two fourth lead wire layers are provided for one second mesh-like electrode layer 26 (third lead wire layer). The third and fourth lead wire layers 27 and 28 located side by side along the Y-direction are arranged such that the distances between adjacent third and fourth lead wire layers 27 and 28 are the same, and one end of each fourth lead wire layer 28 is connected to the corresponding second boundary line 29. The other end of the fourth lead wire layer 28 is connected to the corresponding third lead wire layer 27. The shape of the fourth lead wire layers 28 is substantially the same as the shape of the above-described second lead wire layers 22, and the positional relationship between the third and fourth lead wire layers 27 and 28 is substantially the same as the above-described positional relationship between the first and second lead wire layers 21 and 22. In the present description, therefore, detailed description of the third and fourth lead wire layers 27 and 28 will be omitted.

As illustrated in FIG. 15, the second boundary lines 29 are provided to correspond to the second mesh-like electrode layers 26. In the present embodiment, four second boundary lines 29 are formed for the four second mesh-like electrode layers 26. The second boundary lines 29 extend in the Y-direction along the outer edges of the second mesh-like electrode layers 26. In the present embodiment, the third and fourth lead wire layers 27 and 28 are led out from the −X-direction side of the second mesh-like electrode layers 26 located at the +Y-direction side and, therefore, the second boundary lines 29 corresponding to these second mesh-like electrode layers 26 are located at the outer edges of the second mesh-like electrode layers 26 at the −X-direction side. In contrast, the third and fourth lead wire layers 27 and 28 are led out from the +X-direction side of the second mesh-like electrode layers 26 located at the −Y-direction side and, therefore, the second boundary lines 29 corresponding to these second mesh-like electrode layers 26 are located at the outer edges of the second mesh-like electrode layers 26 at the +X-direction side.

As in the first conductor layer 19, the second mesh-like electrode layer 26, the third and fourth lead wire layers 27 and 28, and the second boundary line 29 which constitute each part of the second conductor layer 25 are formed integrally with one another. As in the first conductor layer 19, the second mesh-like electrode layers 26 and the third and fourth lead wire layers 27 and 28 are each formed to have a mesh-like shape in which a plurality of conductor lines having conductivity intersects one another. In the present embodiment, the mesh structure which constitutes the first conductor layer 19 (specifically, the first mesh-like electrode layers 20 and the first and second lead wire layers 21 and 22) and the mesh structure which constitutes the second conductor layer 25 (specifically, the second mesh-like electrode layers 26 and the third and fourth lead wire layers 27 and 28) corresponding to the first conductor layer 19 are substantially in the same form (i.e., the shape and arrangement of the conductor lines which constitute them are substantially the same).

The relationship between the mesh structure which constitutes the first conductor layer 19 and the mesh structure which constitutes the second conductor layer 25 is not particularly limited to the above. In other words, the mesh structure of the first conductor layer 19 and the mesh structure of the second conductor layer 25 may be different. For example, the mesh of the second mesh-like electrode layers 26 of the second conductor layer 25 may be coarse or fine as compared with the mesh of the first mesh-like electrode layers 20 of the first conductor layer 19. In addition or alternatively, the mesh of the third and fourth lead wire layers 27 and 28 of the second conductor layer 25 may be coarse or fine as compared with the mesh of the first and second lead wire layers 21 and 22 of the first conductor layer 19. Adjustment of the density of mesh in the first and second conductor layers 19 and 25 can be performed by varying the shape of conductor lines which constitute them (e.g. width of conductor lines) and the arrangement of conductor lines (e.g. pitch between adjacent conductor lines).

The third resin layer 30 serves as a protection layer that protects the second conductor layer 25 from external. As illustrated in FIG. 16, the third resin layer 30 is provided on the second resin layer 24 so that the second conductor layer 25 is interposed between the second and third resin layers 24 and 30. The third resin layer 30 can thus cover the second conductor layer 25 thereby to suppress the occurrence of scattering or the like of light at the surface of the wiring body 17. Such a third resin layer 30 can be constituted of the same material as that of the first resin layer 18.

The wiring board 15 of the present embodiment can be manufactured using the same method as the method of manufacturing the wiring board as described in the first embodiment. In the present embodiment, therefore, the description in the first embodiment will be borrowed herein for the method of manufacturing the wiring board to omit repetition of the description.

Although not particularly illustrated, after the method of manufacturing the wiring board as described in the first embodiment is performed, the third resin layer 30 is formed on the obtained wiring board through applying and curing a resin material so that the resin material covers the second conductor layer 25 (the second mesh-like electrode layers 26, the third and fourth lead wire layers 27 and 28, and the second boundary lines 29).

The same method as the method of applying the adhesive material 13 as described in the first embodiment can be exemplified as the method of applying the resin material which constitutes the third resin layer 30. The applied resin material is cured to form the third resin layer 30. The same method as the method of curing the adhesive material 13 as described in the first embodiment can be used as the method of curing the resin material. The wiring board 15 comprising the wiring body 17 can thus be obtained.

The wiring body 17, wiring board 15, and touch sensor 14 according to the present embodiment have the following effects.

In the present embodiment, the first mesh-like electrode layer 20 and the first and second lead wire layers 21 and 22 are electrically connected via the first boundary line 23 and, therefore, electrode terminals are not necessary for the electric connection. This allows the wiring body 17 to be reduced in size.

The wiring body 17 of the present embodiment further comprises at least one second mesh-like lead wire layer 22 (in the present embodiment, two second lead wire layers 22 for one first boundary line 23). One end 2201 of each second lead wire layer 22 is connected to the first boundary line 23 while the other end 2202 is connected to the first lead wire layer 21. This can distribute the stress applied to the connection portion between the first and second lead wire layers 21 and 22 and the first boundary line 23 (i.e. in the vicinity of the end parts 215 and 2201) and the breakage thereof can be suppressed. It is thereby possible to improve the reliability of connection between the first mesh-like electrode layer 20 and the first and second lead wire layers 21 and 22 via the first boundary line 23.

Existence of the plurality of second lead wire layers 22 allows the conduction paths to increase between the first mesh-like electrode layer 20 and an external circuit. The electric resistance value can thus be reduced in the first and second lead wire layers 21 and 22.

In the present embodiment, attention is also focused on suppression of stress concentration at the connection portion between the first boundary line 23 and the first and second lead wire layers 21 and 22. Specifically, when mesh-like lead wire layers (first and second lead wire layers 21 and 22) are used, the rigidity of the connection portion as a whole between the first boundary line 23 and the first and second lead wire layers 21 and 22 is reduced without changing the mesh pattern, and the stress concentration is suppressed at the connection portion between the first boundary line 23 and the first and second lead wire layers 21 and 22.

More specifically, if, hypothetically, a single mesh-like lead wire layer is used, the rigidity of a connection portion as a whole between the boundary line and the mesh-like lead wire layer will increase to concentrate the stress at the connection portion, so it may be necessary to suppress the stress concentration, such as by increasing the pitch of mesh (i.e. making the mesh coarse). In contrast, in the present embodiment, at least one second lead wire layer 22 is purposely provided and adjacent first and second lead wire layers 21 and 22 are separated from each other thereby to form a region, in which the second and third conductor lines 211 and 221 are not formed, between the first and second lead wire layers 21 and 22.

Thus, the connection portion between the first boundary line 23 and the first and second lead wire layers 21 and 22 includes the region in which the second and third conductor lines 211 and 221 are not formed, and the rigidity of the connection portion as a whole between the first boundary line 23 and the first and second lead wire layers 21 and 22 is thereby reduced to suppress the stress concentration at the connection portion while, on the other hand, the tightly-connected state can be maintained in the connection portion between the first boundary line 23 and the first and second lead wire layers 21 and 22 because the connection portion can be provided with fine meshes. This can suppress the breakage of the first boundary line 23 and the first and second lead wire layers 21 and 22.

In the present embodiment, the first mesh-like electrode layer 20 is formed with the mesh-like shape using the plurality of first conductor lines 201, and the relationship between the width $W_{12}$ of the first conductor lines 201 which constitute the first mesh-like electrode layer 20 and the width $W_{42}$ of the first boundary line 23 is set to satisfy the above Expression (24). It is thereby possible to reduce the electric resistance value between the first mesh-like electrode layer 20 and the first and second lead wire layers 21 and 22 via the first boundary line 23.

In the first mesh-like electrode layer 20 of the present embodiment, the plurality of first unit meshes 205 having the same shape is defined by intersecting the plurality of first conductor lines 201, and the relationship between the maximum value $D_2$ of the width of first unit meshes 205 and the distance $L_2$ between adjacent first and second lead wire layers 21 and 22 satisfies the above Expression (16). This allows easy distribution of the stress applied to the connection portion between the first and second lead wire layers 21 and 22 and the first boundary line 23 and can prevent the local increase in the rigidity of the first and second lead wire layers 21 and 22 to suppress the difference in rigidity of the first mesh-like electrode layer 20 and the first and second lead wire layers 21 and 22. Consequently, the breakage of the first mesh-like electrode layer 20 and the first and second lead wire layers 21 and 22 can be suppressed and it is thus possible to further improve the reliability of connection between the first mesh-like electrode layer 20 and the first and second lead wire layers 21 and 22 via the first boundary line 23.

In the present embodiment, the first lead wire layer 21 is formed to have a mesh-like shape using the plurality of second conductor lines 211 and the second lead wire layer 22 is also formed to have a mesh-like shape using the plurality of third conductor lines 221. The difference in rigidity of the first mesh-like electrode layer 20 and the first and second lead wire layers 21 and 22 can therefore be further suppressed. This can further improve the reliability of connection between the first mesh-like electrode layer 20 and the first and second lead wire layers 21 and 22 via the first boundary line 23. The above actions and effects can be more significant when the relationship between the width $W_{12}$ of the first conductor lines 201 and the width $W_6$ of the third conductor lines 221 is set to satisfy the above Expression (18).

The above actions and effects are described for the first conductor layer 19, but in the present embodiment, the first conductor layer 19 and the second conductor layer 25 have the same configuration and, therefore, the same actions and effects as the above-described actions and effects can be obtained for the second conductor layer 25. In this case, the "second mesh-like electrode layers 26" in the present embodiment correspond to an example of the "electrode layer" in the present invention, the "third lead wire layers 27" in the present embodiment correspond to an example of the "first lead wire layer" in the present invention, the "fourth lead wire layers 28" in the present embodiment correspond to an example of the "second lead wire layer" in the present invention, and the "second boundary lines 29" in the present embodiment correspond to an example of the "boundary line" in the present invention.

Figure 20:
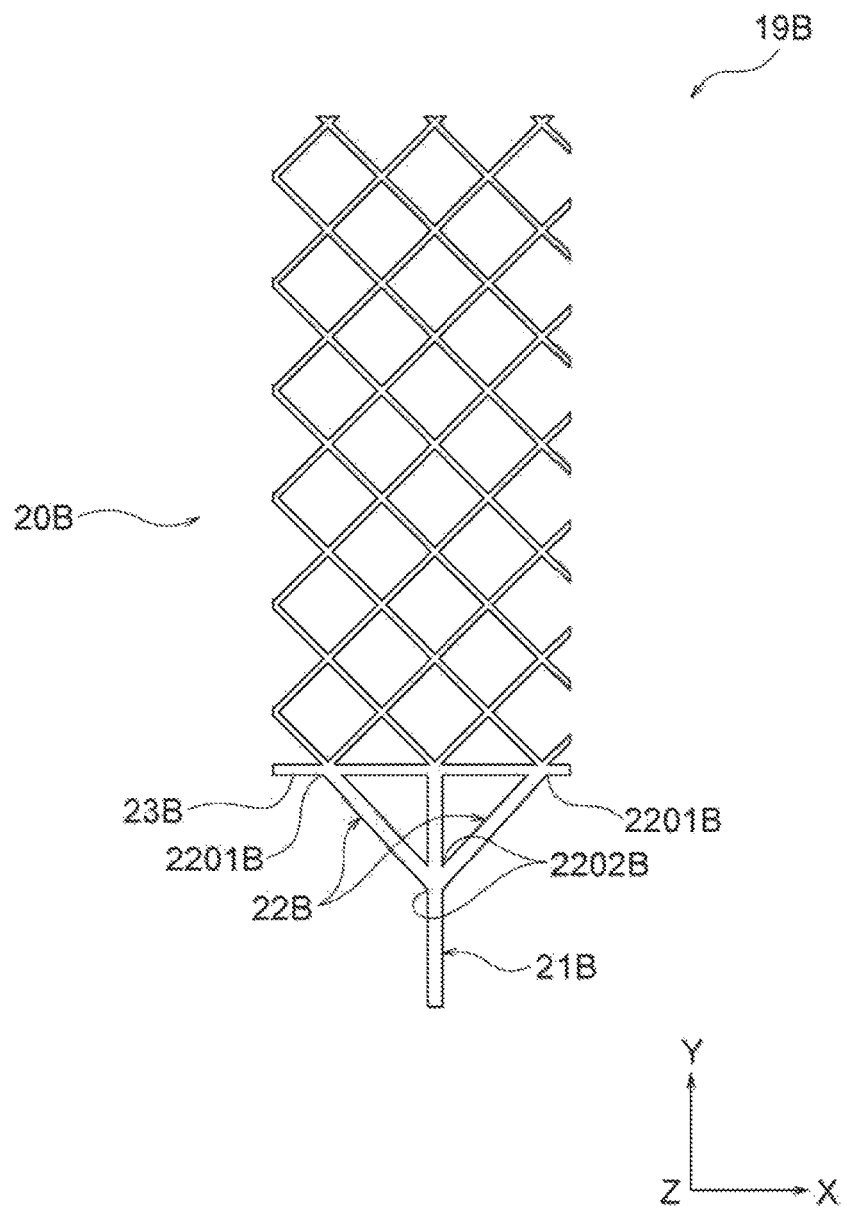
FIG. 20 is a plan view illustrating a first modified example of the first conductor layer according to the second embodiment of the present invention.

Modified examples of the present embodiment will be described below. FIG. 20 is a plan view illustrating a first modified example of the first conductor layer according to the second embodiment of the present invention and FIG. 21 is a plan view illustrating a second modified example of the first conductor layer according to the second embodiment of the present invention.

For example, the wiring body 17 of the present embodiment is provided with the curved second lead wire layers 22 and 22 disposed at both sides of the first lead wire layer 21, but the arrangement is not particularly limited to the above and, as illustrated in FIG. 20, second lead wire layers 22B and 22B may be in linear shapes. In this example, the second lead wire layers 22B and 22B are each connected to a boundary line 23B at one end part 2201B and to a first lead wire layer 21B at the other end part 2202B and formed so as to connect between the end parts 2201B and 2202B in a linear fashion.

Figure 21:
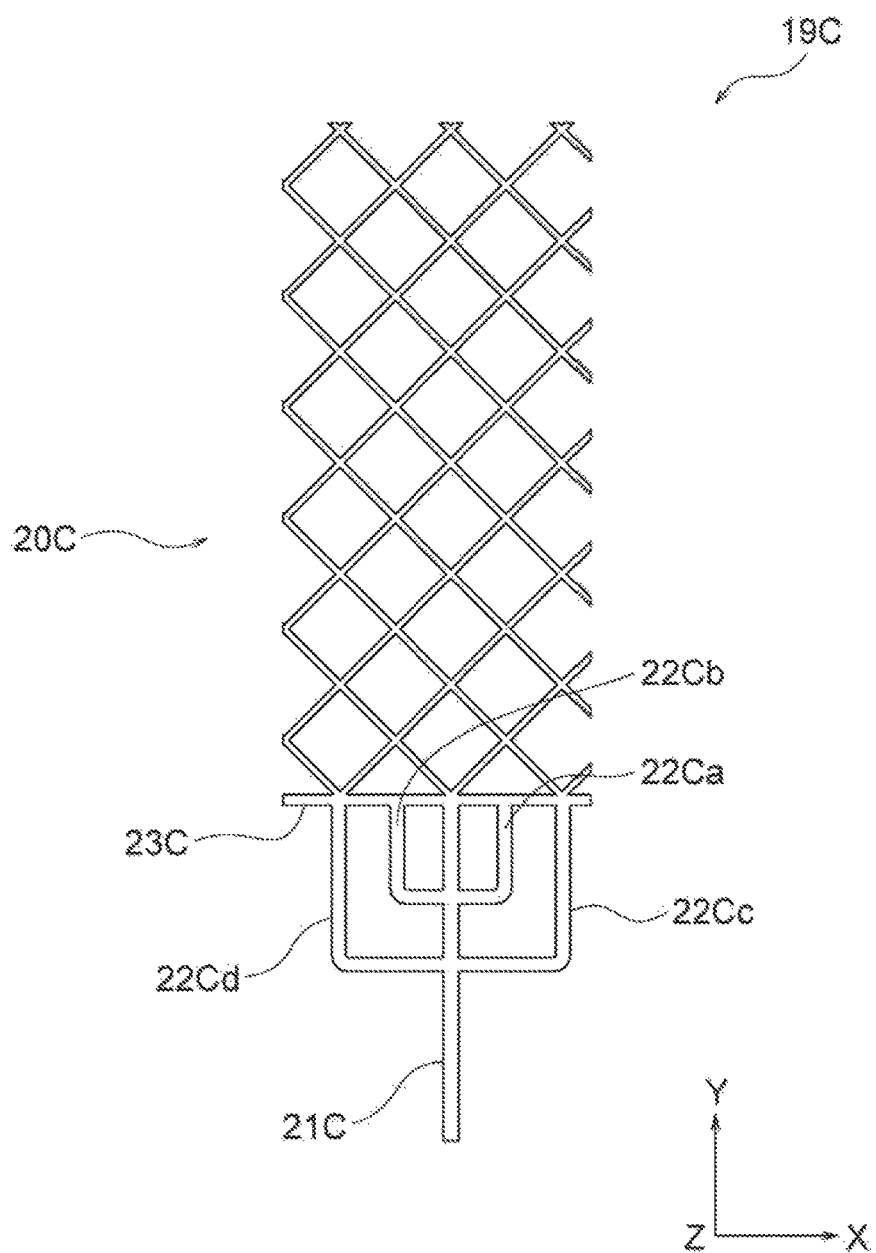
FIG. 21 is a plan view illustrating a second modified example of the first conductor layer according to the second embodiment of the present invention.

In the example illustrated in FIG. 21, second lead wire layers 22Ca and 22Cb are electrically connected to a first lead wire layer 21C at a position at which they are close to each other. Similarly, second lead wire layers 22Cc and 22Cd are electrically connected to the first lead wire layer 21C at a position at which they are close to each other.

FIG. 20 and FIG. 21 illustrate only outer shapes of the first lead wire layers 21B and 21C and second lead wire layers 22B and 22C for easy understanding thereof, but in practice, they are each formed to have a mesh-like shape using a plurality of conductor lines.

In the present embodiment, electrode patterns 20 and 26 are each formed to have a mesh-like shape using a plurality of conductor lines, but are not particularly limited to this, and may be formed of solid patterns. In this case, indium tin oxide (ITO) or conductive polymer having optical transparency may be used as the material which constitutes the electrode patterns. Also in the above-described modified examples, the electrode patterns can be formed of solid patterns.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, the touch sensor 1 of the present embodiment is a projection-type touch panel sensor using a capacitance scheme, which comprises two conductor layers, but the present invention is not particularly limited to this and can be applied to a surface-type (capacitance coupling-type) touch panel sensor using a capacitance scheme, which comprises a single conductor layer.

In the above-described embodiments, a metal material or a carbon-based material is used as the conductive material which constitutes the mesh-like electrode layers, lead wire layers, and boundary lines, for example, but the present invention is not particularly limited to this, and a mixture of a metal material and a carbon-based material may also be used. In this case, in an example of the first conductor line 64 of the first embodiment, for example, the carbon-based material may be disposed at the top surface 62 side of the first conductor line 64 and the metal-based material may be disposed at the contact surface 61 side. Conversely, the metal-based material may be disposed at the top surface 62 side of the first conductor line 64 and the carbon-based material may be disposed at the contact surface 61 side.

In one or more embodiments, for example, the base material 3 may be omitted from the wiring board 2. In this case, the wiring body or the wiring board may be configured, for example, as a form in which a release sheet is provided on the lower surface of the adhesion layer 5 and is removed when the wiring body or the wiring board is mounted by adhesion to an object for mounting (such as a film, surface glass, polarization plate, and display). In this form, the "adhesion layer 5" corresponds to an example of the "first resin layer" of the present invention and the "object for mounting" corresponds to an example of the "support body" of the present invention. In one or more embodiments, the wiring body or the wiring board may be configured as a form in which the wiring body or the wiring board is mounted by adhesion to the above-described object for mounting via the resin layer 9 which covers the mesh-like electrode layers 6 or via an adhesion layer provided on the resin layer 9. Also in this case, the base material 3 may be omitted from the wiring board 2. In this form, the "object for mounting" corresponds to an example of the "support body" of the present invention.

In one or more embodiments, the adhesion layer 5 may be omitted and the mesh-like electrode layers 6, the lead wire layers 7, and the boundary lines 8 may be provided directly on the base material 3. In this case, the base material 3 is constituted of a resin. In this form, the "base material 3" corresponds to an example of the "first resin layer" of the present invention.

In the above-described embodiments, the wiring body has been described as being used in a touch sensor, but the use of the wiring body is not particularly limited to this. For example, the wiring body may be used as a heater by flowing current through the wiring body to generate heat, such as by resistance heating. In this case, it is preferred to use a carbon-based material having a relatively high electric resistance value as the conductive powder of the conductor patterns. In one or more embodiments, the wiring body may be used as an electromagnetic shield by grounding a part of the conductor part of the wiring body. In one or more embodiments, the wiring body may be used as an antenna. In such cases, the object for mounting the wiring body corresponds to an example of the support body of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims

DESCRIPTION OF REFERENCE NUMERALS

1 Touch sensor
2, 2B-2F Wiring board
   3 Base material
      31 Main surface
4, 4B-4F Wiring body
   5 Adhesion layer
      51 Flat part
         511 Main surface
      52 Support part
         521 Side surface
         522 Contact surface
   6 Mesh-like electrode layer
      61 Contact surface
      62 Top surface
         621 Top surface flat part
      63 Side surface
         631, 632 End part
         633 Side surface flat part
      64a, 64b, 64aB, 64bB First conductor line
         641a, 641b Wide part
      65 First unit mesh
      66 First intersection
      T1 Electrode-side region
   7 Lead wire layer
      71 Contact surface
      72 Top surface
         721 Top surface flat part 73 Side surface
   731, 732 End part
   733 Side surface flat part
74a, 74b Second conductor line
75 Second unit mesh
76 End part
77 Curved part
T2 Wiring-side region
8, 8B Boundary line
   81 Contact surface
   82 Top surface
      821 Top surface flat part
   83 Side surface
      831, 832 End part
      833 Side surface flat part
9 Resin layer
101 Mesh-like electrode layer
102 Lead wire layer
14 Touch sensor
15 Wiring board
   16 Base material
      161 Main surface
   17 Wiring body
      18 First resin layer
         181 Flat part
         182 Support part
      19 First conductor layer
         20 First electrode pattern
            201 First conductor line
            205 First unit mesh
         21 First lead wire layer
            211 Second conductor line
            215 End part
            216 Second unit mesh
         22 Second lead wire layer
            2201, 2202 End part
            221 Third conductor line
            222 Contact surface
            223 Top surface
            224 Side surface
            225 Third unit mesh
         23 First boundary line
      24 Second resin layer
         241 Main part
         242 Support part
      25 Second conductor layer
         26 Second electrode pattern
         27 Third lead wire layer
         28 Fourth lead wire layer
         29 Second boundary line
      30 Third resin layer
11 Recessed plate
111 First recess
112 Second recess
113 Third recess
12 Conductive material
121, 122 Surface
13 Adhesive material

The invention claimed is:

1. A wiring body comprising:
a first resin layer;
a plurality of electrodes each of which comprises an electrode layer provided on the first resin layer and is formed by first conductor lines, the electrode layer having a mesh-like shape;
a plurality of first lead wire layers each of which is provided on the first resin layer and is formed by second conductor lines, the first lead wire layers each having a mesh-like shape; and
a plurality of boundary lines interposed between the electrodes and the first lead wire layers, respectively, wherein each of the boundary lines contacts at least two of the first conductor lines of each of the electrodes and one end part of each of the first lead wire layers, and has a line-like shape, wherein
the wiring body satisfies following Expressions (1) and (2)

$$W_1 < W_2 \quad (1)$$

$$L_1 > W_3 \quad (2)$$

where
$W_1$ represents a width of each of the first conductor lines in a direction orthogonal to an extending direction of each of the first conductor lines,
$W_2$ represents a width of each of the second conductor lines in a direction orthogonal to an extending direction of each of the second conductor lines,
$L_1$ represents a length of each of the boundary lines in its extending direction, and
$W_3$ represents a width of the one end part of each of the first lead wire layers in a direction orthogonal to an extending direction of each of the first lead wire layers,
the wiring body further comprises a second lead wire layer having one end connected to one of the boundary lines and another end connected to one of the first lead wire layers, the second lead wire layer being formed by third conductor lines and having a mesh-like shape,
the one of the first lead wire layers and the second lead wire layer are separated from each other, and
a region in which the second conductor lines and the third conductor lines are not formed is provided between the one of the first lead wire layers and the second lead wire layer which are adjacent to each other.

2. The wiring body according to claim 1, wherein each of the first lead wire layers has the same width between the one end part and a portion at which each of the first lead wire layers curves first.

3. The wiring body according to claim 1, wherein the electrodes are configured such that unit meshes having the same shape are arranged, and the wiring body satisfies a following Expression (3);

$$D > W_3 \quad (3)$$

where D represents a maximum value of a width of the unit meshes in a direction orthogonal to an extending direction of the electrode layer.

4. The wiring body according to claim 1, wherein
a first region is defined by the second conductor lines and each of the boundary lines, and
the first region is filled with a material having conductivity.

5. The wiring body according to claim 1, wherein
first adhesion surfaces between the first conductor lines and the first resin layer curve convexly toward the first conductor lines in a cross-sectional view,
second adhesion surfaces between the second conductor lines and the first resin layer curve convexly toward the second conductor lines in a cross-sectional view, and
the wiring body satisfies a following Expression (4);

$$R_1 < R_2 \quad (4)$$

where
- $R_1$ represents a curvature of the first adhesion surfaces, and
- $R_2$ represents a curvature of the second adhesion surfaces.

6. The wiring body according to claim 1, wherein conductor lines including the first conductor lines, the second conductor lines, and the boundary lines each have:
- a first surface contacted with the first resin layer, and
- a second surface that is a surface opposite to the first surface, and surface roughness of the first surface is larger than surface roughness of the second surface.

7. The wiring body according to claim 1, wherein the each of the boundary lines extends nonlinearly.

8. The wiring body according to claim 1, wherein
the second conductor lines which constitute each of the first lead wire layers are arranged to incline with respect to the extending direction of each of the first lead wire layers,
the third conductor lines which constitute the second lead wire layer are arranged to incline with respect to an extending direction of the second lead wire layer,
a side end part of each of the first lead wire layers extends in the extending direction of each of the first lead wire layers in a zigzag shape by the second conductor lines which constitute each of the first lead wire layers, and
a side end part of the second lead wire layer extends in the extending direction of the second lead wire layer in a zigzag shape by the third conductor lines which constitute the second lead wire layer.

9. The wiring body according to claim 1, wherein a following Expression (5) is satisfied;

$$W_1 < W_4 \tag{5}$$

where $W_4$ represents a width of each of the boundary lines.

10. The wiring body according to claim 1, wherein the electrodes are configured such that unit meshes having same shape are arranged, and the wiring body satisfies a following Expression (6);

$$D \le L_2 \tag{6}$$

where
- D represents a maximum value of a width of each of the unit meshes in a direction orthogonal to an extending direction of the electrode layer, and
- $L_2$ represents a distance in the extending direction of each of the boundary lines between each of the first lead wire layers and the second lead wire layer which are adjacent to each other.

11. A wiring board comprising:
the wiring body according to claim 1; and
a support body supporting the wiring body.

12. A touch sensor comprising the wiring board according to claim 11.

* * * * *